(12) United States Patent
    Saito

(10) Patent No.: US 12,663,634 B2
(45) Date of Patent: **\*Jun. 23, 2026**

(54) OBSERVATION OPTICAL SYSTEM AND OPTICAL APPARATUS

(71) Applicant: FUJIFILM Corporation, Tokyo (JP)

(72) Inventor: Hiroki Saito, Saitama (JP)

(73) Assignee: FUJIFILM Corporation, Tokyo (JP)

( \* ) Notice: Subject to any disclaimer, the term of this patent is extended or adjusted under 35 U.S.C. 154(b) by 524 days.

This patent is subject to a terminal disclaimer.

(21) Appl. No.: 18/169,717

(22) Filed: Feb. 15, 2023

(65) Prior Publication Data

US 2023/0194852 A1 Jun. 22, 2023

Related U.S. Application Data

(63) Continuation of application No. PCT/JP2021/027945, filed on Jul. 28, 2021.

(30) Foreign Application Priority Data

Aug. 27, 2020 (JP) ................................. 2020-143525

(51) Int. Cl.
    *G02B 25/00* (2006.01)
(52) U.S. Cl.
    CPC .................................. *G02B 25/001* (2013.01)
(58) Field of Classification Search
    CPC .................................................. G02B 25/001
    USPC .................................................. 359/643–645
    See application file for complete search history.

(56) References Cited

U.S. PATENT DOCUMENTS

| | | | |
|---|---|---|---|
| 2015/0362720 A1 | 12/2015 | Saito | |
| 2016/0062105 A1 | 3/2016 | Kawamura et al. | |
| 2017/0242219 A1 | 8/2017 | Kondo | |
| 2019/0171000 A1 | 6/2019 | Takumi | |
| 2019/0258074 A1 | 8/2019 | Miyagishima | |
| 2020/0174341 A1* | 6/2020 | Shinobu | ........ G02B 23/14 |

(Continued)

FOREIGN PATENT DOCUMENTS

| | | |
|---|---|---|
| CN | 107092083 A | 8/2017 |
| CN | 110174807 A | 8/2019 |
| JP | H06-175047 A | 6/1994 |

(Continued)

OTHER PUBLICATIONS

MIL-HDBK-141 "Military Standardization Handbook Optical Design", p. 8-15, Oct. 1962 (Year: 1962).*

(Continued)

*Primary Examiner* — George G. King
(74) *Attorney, Agent, or Firm* — Studebaker Brackett PLLC

(57) ABSTRACT

An observation optical system includes a display element and an eyepiece lens disposed on an eyepoint side of the display element. The eyepiece lens includes a first lens having positive optical power, a second lens having negative optical power, and a third lens consecutively in order from closest to a display element side to the eyepoint side. In a case where a half value of a longest diameter of a display region in the display element is denoted by H, and a focal length of the eyepiece lens in a state where diopter is −1 diopter is denoted by f, the observation optical system satisfies a conditional expression represented by 0.35<H/f<0.6.

34 Claims, 22 Drawing Sheets

EXAMPLE 7

(56) References Cited

U.S. PATENT DOCUMENTS

| | | | | |
|---|---|---|---|---|
| 2022/0404607 A1* | 12/2022 | Miyagishima | ........... | G02B 9/34 |
| 2023/0115405 A1* | 4/2023 | Saito | ........................ | G02B 9/60 |
| | | | | 359/557 |

FOREIGN PATENT DOCUMENTS

| | | | |
|---|---|---|---|
| JP | H06-194583 A | 7/1994 |
| JP | H08-254660 A | 10/1996 |
| JP | H09-054259 A | 2/1997 |
| JP | 2000-199866 A | 7/2000 |
| JP | 2016-001209 A | 1/2016 |
| JP | 2016-038521 A | 3/2016 |
| JP | 2016-051061 A | 4/2016 |
| JP | 2016-051063 A | 4/2016 |
| JP | 2017-068129 A | 4/2017 |
| JP | 2017-102314 A | 6/2017 |
| JP | 2018-189879 A | 11/2018 |
| JP | 2019-101205 A | 6/2019 |
| JP | 2020-027113 A | 2/2020 |
| JP | 2020-091340 A | 6/2020 |
| JP | 2021-117457 A | 8/2021 |
| WO | 2019/054358 A1 | 3/2019 |

OTHER PUBLICATIONS

An Office Action; "Notice of Reasons for Refusal," mailed by the Japanese Patent Office on Aug. 22, 2023, which corresponds to Japanese Patent Application No. 2022-545571 and is related to U.S. Appl. No. 18/169,717; with English language translation.

An Office Action; "Notice of Reasons for Refusal," mailed by the Japanese Patent Office on Jan. 9, 2024, which corresponds to Japanese Patent Application No. 2022-545571 and is related to U.S. Appl. No. 18/169,717; with English language translation.

International Search Report issued in PCT/JP2021/027945; mailed Oct. 19, 2021.

International Preliminary Report On Patentability (Chapter I) and Written Opinion of the International Searching Authority issued in PCT/JP2021/027945; issued Feb. 28, 2023.

An Office Action; mailed by the China National Intellectual Property Administration of the People's Republic of China on Aug. 28, 2025, which corresponds to Chinese Application No. 202180051935.0 and is related to U.S. Appl. No. 18/169,717.

Office Action issued in CN 202180051935.0; mailed by the State Intellectual Property Office of the People's Republic of China on Dec. 10, 2025.

An Office Action mailed by China National Intellectual Property Administration on Jan. 28, 2026, which corresponds to Chinese Patent Application No. 202180051935.0 and is related to U.S. Appl. No. 18/169,717.

* cited by examiner

EXAMPLE 1

EXAMPLE 1

EXAMPLE 1

EXAMPLE 1

EXAMPLE 2

EXAMPLE 2

EXAMPLE 3

FIG. 9

EXAMPLE 3

EXAMPLE 3

EXAMPLE 4

EXAMPLE 4

EXAMPLE 5

EXAMPLE 5

EXAMPLE 6

EXAMPLE 6

EXAMPLE 7

EXAMPLE 7

<u>EXAMPLE 7</u>

OBSERVATION OPTICAL SYSTEM AND OPTICAL APPARATUS

CROSS-REFERENCE TO RELATED APPLICATIONS

This application is a continuation application of International Application No. PCT/JP2021/027945, filed on Jul. 28, 2021, which claims priority from Japanese Patent Application No. 2020-143525, filed on Aug. 27, 2020. The entire disclosure of each of the above applications is incorporated herein by reference.

BACKGROUND

Technical Field

The present disclosure relates to an observation optical system and an optical apparatus.

Related Art

In the related art, lens systems disclosed in JP2016-001209A and JP2017-068129A have been known as an eyepiece lens.

In recent years, there has been a demand for an observation optical system that enables observation with a wider visual angle while having favorable performance.

SUMMARY

The present disclosure is conceived in view of the above matter, and an object thereof is to provide an observation optical system that enables observation with a wider visual angle while having favorable performance, and an optical apparatus comprising the observation optical system.

An observation optical system according to an aspect of the disclosed technology comprises a display element and an eyepiece lens disposed on an eyepoint side of the display element, in which the eyepiece lens includes a first lens having positive optical power, a second lens having negative optical power, and a third lens consecutively in order from closest to a display element side to the eyepoint side, and in a case where a half value of a longest diameter of a display region in the display element is denoted by H, and a focal length of the eyepiece lens in a state where diopter is −1 diopter is denoted by f, Conditional Expression (1) below is satisfied.

$$0.35 < H/f < 0.6 \tag{1}$$

It is preferable that in diopter adjustment, at least three lenses in the eyepiece lens move along an optical axis.

It is preferable that a lens surface of the first lens on the display element side has a shape in which negative optical power is increased in a direction of separation from an optical axis, or a shape in which positive optical power is decreased in the direction of separation from the optical axis.

It is preferable that a lens surface of the second lens on the eyepoint side has a shape in which positive optical power is increased in a direction of separation from an optical axis, or a shape in which negative optical power is decreased in the direction of separation from the optical axis.

The eyepiece lens may be configured to consist of four or more lenses. The eyepiece lens may be configured to consist of four lenses.

It is preferable that the observation optical system of the above aspect satisfies at least one of Conditional Expressions (1) to (25) or (1-1) to (6-1) below.

$$0.35 < H/f < 0.6 \tag{1}$$

$$0.03 < (R2r+R2f)/(R2r-R2f) < 0.9 \tag{2}$$

$$-0.13 < (R2f-R1r)/(R2f+R1r) < 0.2 \tag{3}$$

$$-5 < (R1r+R1f)/(R1r-R1f) < -0.2 \tag{4}$$

$$-2.5 < (R3r+R3f)/(R3r-R3f) < 8 \tag{5}$$

$$1.61 < Nmax < 2.2 \tag{6}$$

$$-4 < f/f2 < -0.9 \tag{7}$$

$$-1 < f/f12 < 0.12 \tag{8}$$

$$0.83 < f/fr < 2 \tag{9}$$

$$-2.2 < f1/f2 < -0.73 \tag{10}$$

$$0.66 < f1/fr < 1.6 \tag{11}$$

$$-0.98 < f2/fr < -0.4 \tag{12}$$

$$-0.6 < (R3f-R2r)/(R3f+R2r) < 9 \tag{13}$$

$$1.6 < dL/f < 2.25 \tag{14}$$

$$0.25 < dL12/T2 < 0.81 \tag{15}$$

$$0.18 < H/TL < 0.65 \tag{16}$$

$$0.24 < d01/f < 0.8 \tag{17}$$

$$-1.15 < H/f2 < -0.35 \tag{18}$$

$$0.32 < H/fr < 0.78 \tag{19}$$

$$0.7 < f/f1 < 2.2 \tag{20}$$

$$-4 < (R4f-R3r)/(R4f+R3r) < 4.2 \tag{21}$$

$$-15 < (R4r+R4f)/(R4r-R4f) < 0.5 \tag{22}$$

$$0.15 < d12/d2 < 5.8 \tag{23}$$

$$0.01 < d12/TL < 0.16 \tag{24}$$

$$0.25 < H/f1 < 0.9 \tag{25}$$

$$0.37 < H/f < 0.5 \tag{1-1}$$

$$0.06 < (R2r+R2f)/(R2r-R2f) < 0.65 \tag{2-1}$$

$$-0.09 < (R2f-R1r)/(R2f+R1r) < 0.14 \tag{3-1}$$

$$-3 < (R1r+R1f)/(R1r-R1f) < -0.4 \tag{4-1}$$

$$-1.5 < (R3r+R3f)/(R3r-R3f) < 5 \tag{5-1}$$

$$1.66 < Nmax < 2 \tag{6-1}$$

where

H: half value of longest diameter of display region in display element f: focal length of eyepiece lens in state where diopter is −1 diopter f1: focal length of first lens f2: focal length of second lens f12: combined focal length of first lens and second lens in state where diopter is −1 diopter fr: combined focal length of all lenses on eyepoint side with respect to second lens in state where diopter is −1 diopter R1f: paraxial curvature radius of surface of first lens on display element side R1r: paraxial curvature radius of surface of first lens on eyepoint side R2f: paraxial curvature radius of surface of second lens on display element side R2r: paraxial curvature radius of surface of second lens on eyepoint side R3f: paraxial curvature radius of surface of third lens on display element side R3r: paraxial curvature radius of surface of third lens on eyepoint side R4f: paraxial curvature radius of surface of fourth lens on display element side R4r: paraxial curvature radius of surface of fourth lens on eyepoint side d01: air conversion distance on optical axis from display surface of display element to surface of first lens on display element side in state where diopter is −1 diopter d12: distance on optical axis from surface of first lens on eyepoint side to surface of second lens on display element side in state where diopter is −1 diopter d2: thickness of second lens on optical axis dL: distance on optical axis from surface of first lens on display element side to lens surface of eyepiece lens closest to eyepoint side in state where diopter is −1 diopter dL12: distance on optical axis from surface of first lens on display element side to surface of second lens on eyepoint side in state where diopter is −1 diopter T2: sum of air conversion distance on optical axis from display surface of display element to surface of first lens on display element side and distance on optical axis from surface of first lens on display element side to surface of second lens on eyepoint side in state where diopter is −1 diopter TL: sum of air conversion distance on optical axis from display surface of display element to surface of first lens on display element side and distance on optical axis from surface of first lens on display element side to lens surface of eyepiece lens closest to eyepoint side in state where diopter is −1 diopter Nmax: maximum value of refractive indexes of all lenses provided in eyepiece lens with respect to d line An optical apparatus according to another aspect of the present disclosure comprises the observation optical system of the above aspect.

In the present specification, "consist of" or "consisting of" is intended to mean that a lens that substantially does not have optical power, optical elements such as a stop, a filter, and a cover glass other than a lens, and a lens flange, a lens barrel, and the like may be included in addition to illustrated constituents.

In the present specification, a "lens having positive optical power" and a "positive lens" have the same meaning. A "lens having negative optical power" and a "negative lens" have the same meaning. A "single lens" means one non-cemented lens. A compound aspherical lens (a lens that is composed of a spherical lens and a film of an aspherical shape formed on the spherical lens as a single body and functions as one aspherical lens as a whole) is not regarded as a cemented lens and is treated as one lens. A sign of optical power, a curvature radius, and a surface shape related to a lens including an aspherical surface are considered in a paraxial region unless otherwise specified. For a sign of the curvature radius, the sign of the curvature radius of a surface having a shape of a convex surface facing toward the display element side is positive, and the sign of the curvature radius of a surface having a shape of a convex surface facing toward the eyepoint side is negative.

The "focal length" used in the conditional expressions is a paraxial focal length. The values used in the conditional expressions are values based on a d line. In the present specification, "d line", "C line", and "F line" are bright lines. A wavelength of the d line is 587.56 nanometers (nm). A wavelength of the C line is 656.27 nanometers (nm). A wavelength of the F line is 486.13 nanometers (nm).

According to the present disclosure, an observation optical system that enables observation with a wider visual angle while having favorable performance, and an optical apparatus including the observation optical system can be provided.

BRIEF DESCRIPTION OF THE DRAWINGS

FIG. 9 is a spherical aberration diagram, an astigmatism diagram, a distortion diagram, and a lateral chromatic aberration diagram of the observation optical system of Example 3.

DESCRIPTION OF EMBODIMENTS

Figure 1:
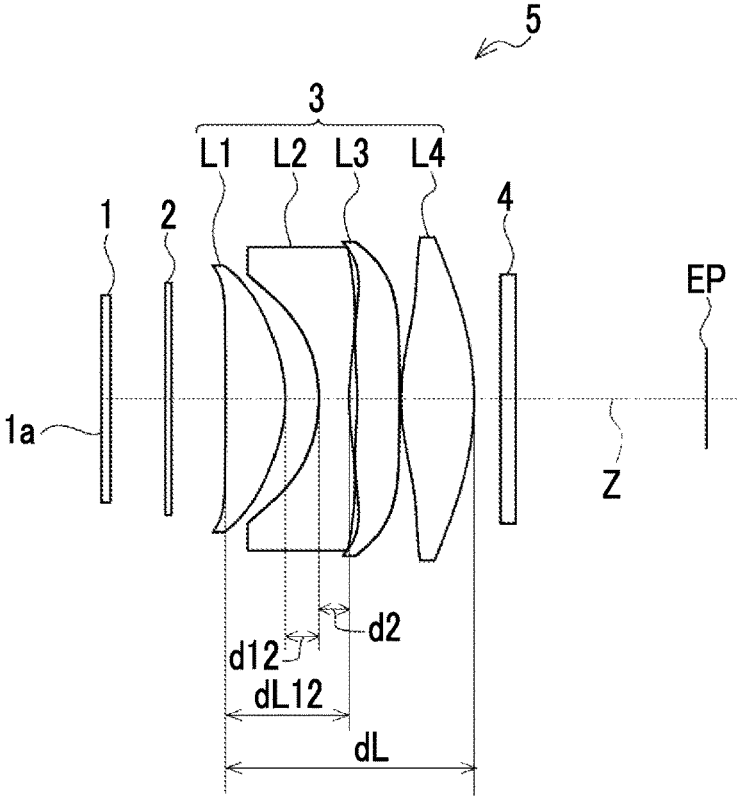
FIG. 1 is a cross-sectional view that corresponds to an observation optical system of Example 1 and illustrates a configuration of an observation optical system according to one embodiment.
Figure 2:
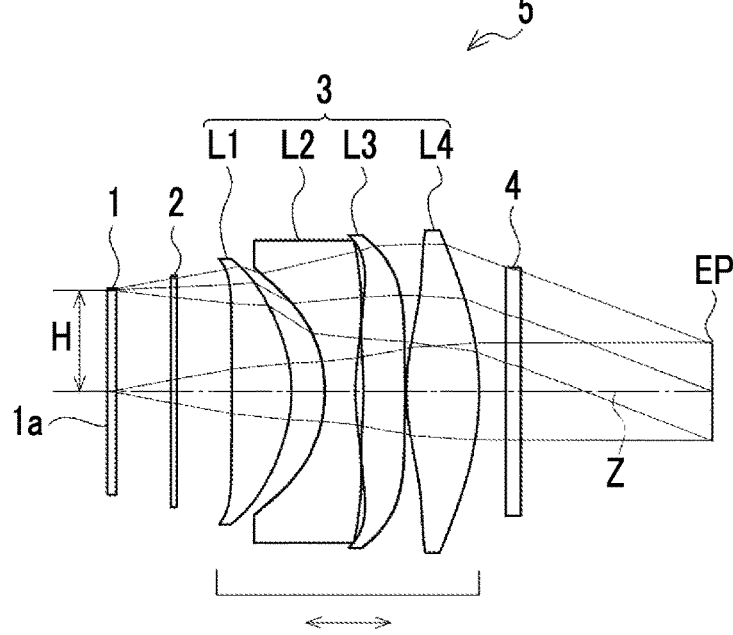
FIG. 2 is a cross-sectional view illustrating the configuration and luminous flux of the observation optical system in FIG. 1.

Hereinafter, an embodiment of the present disclosure will be described with reference to the drawings. FIG. 1 illustrates a cross-sectional view of a configuration of an observation optical system 5 according to one embodiment of the present disclosure. FIG. 2 illustrates the configuration and luminous flux of the observation optical system 5. In FIG. 2, on-axis luminous flux and luminous flux of the maximum visual angle are illustrated as the luminous flux. The examples illustrated in FIG. 1 and FIG. 2 correspond to Example 1 described later. In FIG. 1 and FIG. 2, a left side is illustrated as a display element side, and a right side is illustrated as an eyepoint side. EP in FIG. 1 and FIG. 2 does not illustrate a shape and illustrates a position in an optical axis direction.

The observation optical system 5 comprises a display element 1 and an eyepiece lens 3 disposed on the eyepoint side of the display element 1. The display element 1 is an element that displays an image. The display element 1 has a display region 1a in which the image is displayed. Examples of the display element 1 include a liquid crystal display device or an organic electroluminescence (EL) display element. The display element 1 and the eyepiece lens 3 are disposed at a predetermined air interval. Accordingly, an interval for diopter adjustment can be secured.

The display element 1 is an example of an observed object, and the eyepiece lens 3 is used for observing the image displayed in the display region 1a of the display element 1. That is, the observation optical system 5 is configured to observe the image displayed on the display element 1 through the eyepiece lens 3. In FIG. 1, an example in which an optical member 2 is disposed between the display element 1 and the eyepiece lens 3 and an optical member 4 is disposed between the eyepiece lens 3 and the eyepoint EP is illustrated. Both of the optical member 2 and the optical member 4 are parallel flat plate-shaped members not having optical power and are assumed to be cover glasses for protection, various filters, or the like. In the disclosed technology, a configuration in which at least one of the optical member 2 or the optical member 4 is removed is also available.

The eyepiece lens 3 is configured to include a first lens L1 having positive optical power, a second lens L2 having negative optical power, and a third lens L3 consecutively in order from closest to the display element side to the eyepoint side along an optical axis Z. By configuring the eyepiece lens 3 to consist of three or more lenses, advantage for favorable aberration correction is achieved. Each of the three lenses is preferably a single lens. According to such a configuration, a degree of design freedom can be increased. Thus, advantage for correcting various aberrations and advantage for obtaining a wider visual angle are achieved.

In order to obtain more favorable properties, the eyepiece lens 3 preferably consists of four or more lenses. In such a case, advantage for favorably correcting an overall aberration is achieved. As an example, the eyepiece lens 3 in FIG. 1 consists of the first lens L1 having positive optical power, the second lens L2 having negative optical power, the third lens L3, and a fourth lens L4 in order from the display element side to the eyepoint side. In a case where the eyepiece lens 3 is configured to consist of four lenses, advantage for achieving a small configuration by decreasing the number of lenses while favorably correcting the overall aberration is achieved. All of the four lenses constituting the eyepiece lens 3 in FIG. 1 are single lenses and are disposed at an air interval with respect to an adjacent lens on the optical axis. This configuration can increase a degree of design freedom. Thus, advantage for correcting various aberrations and advantage for obtaining a wider visual angle are achieved.

It is preferable that in diopter adjustment, at least three lenses in the eyepiece lens move along the optical axis Z. In such a case, advantage for suppressing aberration changes in the diopter adjustment is achieved. In the example in FIG. 1, the four lenses of the first lens L1 to the fourth lens L4 move as a single body in the diopter adjustment. In the present specification, "moving as a single body" means moving by the same distance in the same direction at the same time.

The eyepiece lens 3 may be configured to include an aspherical lens. For example, a lens surface of the first lens L1 on the display element side preferably has a shape in which negative optical power is increased in a direction of separation from the optical axis Z, or a shape in which positive optical power is decreased in the direction of separation from the optical axis Z. In such a case, advantage for correcting a distortion is achieved.

In addition, a lens surface of the second lens L2 on the eyepoint side preferably has a shape in which positive optical power is increased in the direction of separation from the optical axis Z, or a shape in which negative optical power is decreased in the direction of separation from the optical axis Z. In such a case, advantage for correcting a lateral chromatic aberration is achieved.

It is preferable that the observation optical system 5 according to the embodiment of the disclosed technology satisfies at least one of Conditional Expressions (1) to (25) below.

$$0.35 < H/f < 0.6 \tag{1}$$

$$0.03 < (R2r + R2f)/(R2r - R2f) < 0.9 \tag{2}$$

$$-0.13 < (R2f - R1r)/(R2f + R1r) < 0.2 \tag{3}$$

$$-5 < (R1r + R1f)/(R1r - R1f) < -0.2 \tag{4}$$

$$-2.5 < (R3r + R3f)/(R3r - R3f) < 8 \tag{5}$$

$$1.61 < Nmax < 2.2 \tag{6}$$

$$-4 < f/f2 < -0.9 \tag{7}$$

$$-1 < f/f12 < 0.12 \tag{8}$$

$$0.83 < f/fr < 2 \tag{9}$$

$$-2.2 < f1/f2 < -0.73 \tag{10}$$

$$0.66 < f1/fr < 1.6 \tag{11}$$

$$-0.98 < f2/fr < -0.4 \tag{12}$$

$$-0.6 < (R3f - R2r)/(R3f + R2r) < 9 \tag{13}$$

$$1.6 < dL/f < 2.25 \tag{14}$$

$$0.25 < dL12/T2 < 0.81 \tag{15}$$

$$0.18 < H/TL < 0.65 \tag{16}$$

$$0.24 < d01/f < 0.8 \tag{17}$$

$$-1.15 < H/f2 < -0.35 \tag{18}$$

$$0.32 < H/fr < 0.78 \tag{19}$$

$$0.7 < f/f1 < 2.2 \tag{20}$$

$$-4 < (R4f - R3r)/(R4f + R3r) < 4.2 \tag{21}$$

$$-15 < (R4r + R4f)/(R4r - R4f) < 0.5 \tag{22}$$

$$0.15 < d12/d2 < 5.8 \tag{23}$$

$$0.01 < d12/TL < 0.16 \tag{24}$$

$$0.25 < H/f1 < 0.9 \tag{25}$$

where

H: half value of longest diameter of display region in display element f: focal length of eyepiece lens in state where diopter is −1 diopter f1 : focal length of first lens f2: focal length of second lens f12: combined focal length of first lens and second lens in state where diopter is −1 diopter fr: combined focal length of all lenses on eyepoint side with respect to second lens in state where diopter is −1 diopter R1f: paraxial curvature radius of surface of first lens on display element side R1r: paraxial curvature radius of surface of first lens on eyepoint side R2f: paraxial curvature radius of surface of second lens on display element side R2r: paraxial curvature radius of surface of second lens on eyepoint side R3f: paraxial curvature radius of surface of third lens on display element side R3r: paraxial curvature radius of surface of third lens on eyepoint side R4f: paraxial curvature radius of surface of fourth lens on display element side R4r: paraxial curvature radius of surface of fourth lens on eyepoint side d01: air conversion distance on optical axis from display surface of display element to surface of first lens on display element side in state where diopter is −1 diopter d12: distance on optical axis from surface of first lens on eyepoint side to surface of second lens on display element side in state where diopter is −1 diopter d2: thickness of second lens on optical axis dL: distance on optical axis from surface of first lens on display element side to lens surface of eyepiece lens closest to eyepoint side in state where diopter is −1 diopter dL12: distance on optical axis from surface of first lens on display element side to surface of second lens on eyepoint side in state where diopter is −1 diopter T2: sum of air conversion distance on optical axis from display surface of display element to surface of first lens on display element side and distance on optical axis from surface of first lens on display element side to surface of second lens on eyepoint side in state where diopter is −1 diopter TL: sum of air conversion distance on optical axis from display surface of display element to surface of first lens on display element side and distance on optical axis from surface of first lens on display element side to lens surface of eyepiece lens closest to eyepoint side in state where diopter is −1 diopter Nmax: maximum value of refractive indexes of all lenses provided in eyepiece lens with respect to d line The "longest diameter of display region in display element" related to H means a double value of a distance between the optical axis Z and a point most separated from the optical axis Z in a diameter direction in the display region 1a that coincides with the optical axis Z at a centroid thereof. For example, in a case where the display region 1a has a rectangular shape, a half length of a diagonal of the display region 1a can be set as H. In addition, for example, in a case where the display region 1a is a perfect circle, a radius of the display region 1a can be set as H. In a case where the display region 1a is an ellipse, a half of the longest diameter (major axis) among diameters of the display region 1a can be set as H.

In addition, the display region 1a means a region in which the image is actually displayed. For example, in a case where the display element 1 comprises a display portion of an aspect ratio of 4:3 in which a plurality of pixels are disposed, and an image of an aspect ratio of 3:2 is displayed in a part of the display portion, the display region 1a refers to a region in which the image of the aspect ratio of 3:2 is displayed. Accordingly, a diameter of the display element 1 does not necessarily coincide with the longest diameter of the display region 1a.

Hereinafter, effects of the above conditional expressions will be described. By causing Conditional Expression (1) not to be less than or equal to a lower limit thereof, advantage for obtaining a wide visual angle is achieved. By causing Conditional Expression (1) not to be greater than or equal to an upper limit thereof, advantage for suppressing aberrations such as a field curvature is achieved.

By causing Conditional Expression (2) not to be less than or equal to a lower limit thereof, an excessive increase in refraction of a ray by the surface of the second lens L2 on the eyepoint side is prevented. Thus, advantage for suppressing the lateral chromatic aberration is achieved. By causing Conditional Expression (2) not to be greater than or equal to an upper limit thereof, an excessive increase in refraction of the ray by a surface of the second lens L2 on the display element side is prevented. Thus, advantage for suppressing the field curvature is achieved.

By causing Conditional Expression (3) not to be less than or equal to a lower limit thereof, an excessive increase in the refraction by the surface of the second lens L2 on the display element side with respect to refraction of an off-axis ray by a surface of the first lens L1 on the eyepoint side is prevented. Thus, excessive correction of the lateral chromatic aberration can be suppressed. By causing Conditional Expression (3) not to be greater than or equal to an upper limit thereof, an excessive decrease in the refraction by the surface of the second lens L2 on the display element side with respect to the refraction of the off-axis ray by the surface of the first lens L1 on the eyepoint side is prevented. Thus, insufficient correction of the lateral chromatic aberration can be suppressed.

By causing Conditional Expression (4) not to be less than or equal to a lower limit thereof, an excessive increase in the refraction of the off-axis ray by the surface of the first lens L1 on the eyepoint side is prevented. Thus, advantage for correcting a coma aberration is achieved. By causing Conditional Expression (4) not to be greater than or equal to an upper limit thereof, an excessive increase in positive optical power of the surface of the first lens L1 on the display element side is prevented, or an excessive decrease in negative optical power of the surface of the first lens L1 on the display element side is prevented. Thus, advantage for suppressing a distortion having a barrel shape is achieved.

By causing Conditional Expression (5) not to be less than or equal to a lower limit thereof, a situation in which a part of a surface of the third lens L3 on the eyepoint side through which the off-axis ray passes has a shape in which a distance between the part and the eyepoint EP is increased can be suppressed. Thus, advantage for achieving size reduction is achieved. In a case where the distance between the part and the eyepoint EP is increased, a height of the off-axis ray from the optical axis Z on the surface of the third lens L3 on the eyepoint side is increased. Accordingly, the third lens L3 has a large diameter, and advantage for achieving size reduction is not achieved. By causing Conditional Expression (5) not to be greater than or equal to an upper limit thereof, an excessive increase in positive optical power of the surface of the third lens L3 on the display element side is prevented, or an excessive decrease in negative optical power of the surface of the third lens L3 on the display element side is prevented. Thus, advantage for correcting the field curvature is achieved.

By causing Conditional Expression (6) not to be less than or equal to a lower limit thereof, an increase in Petzval sum can be suppressed. Thus, advantage for correcting the field curvature is achieved. By causing Conditional Expression (6) not to be greater than or equal to an upper limit thereof, limiting a material selectable as a lens material to a material having a small Abbe number can be prevented. Thus, advantage for correcting a chromatic aberration is achieved. In addition, by causing Conditional Expression (6) not to be greater than or equal to the upper limit thereof, it is possible to contribute to improvement of productivity in processing the material.

In order to obtain more favorable properties, it is more preferable that Conditional Expressions (1) to (25) above are within ranges of Conditional Expressions (1-1) to (25-1) below, respectively.

$$0.37 < H/f < 0.5 \tag{1-1}$$

$$0.06 < (R2r + R2f)/(R2r - R2f) < 0.65 \tag{2-1}$$

$$-0.09 < (R2f - R1r)/(R2f + R1r) < 0.14 \tag{3-1}$$

$$-3 < (R1r + R1f)/(R1r - R1f) < -0.4 \tag{4-1}$$

$$-1.5 < (R3r + R3f)/(R3r - R3f) < 5 \tag{5-1}$$

$$1.66 < N\text{max} < 2 \tag{6-1}$$

$$-3 < f/f2 < -1.15 \tag{7-1}$$

$$-0.7 < f/f12 < 0.03 \tag{8-1}$$

$$0.96 < f/fr < 1.75 \tag{9-1}$$

10

$$-1.9 < f1/f2 < -0.87 \tag{10-1}$$

$$0.73 < f1/fr < 1.45 \tag{11-1}$$

$$-0.9 < f2/fr < -0.5 \tag{12-1}$$

$$-0.3 < (R3f - R2r)/(R3f + R2r) < 6.5 \tag{13-1}$$

$$1.35 < dL/f < 1.94 \tag{14-1}$$

$$0.3 < dL12/T2 < 0.67 \tag{15-1}$$

$$0.21 < H/TL < 0.45 \tag{16-1}$$

$$0.31 < d01/f < 0.65 \tag{17-1}$$

$$-0.99 < H/f2 < -0.5 \tag{18-1}$$

$$0.4 < H/fr < 0.69 \tag{19-1}$$

$$0.9 < f/f1 < 1.9 \tag{20-1}$$

$$-2.5 < (R4f - R3r)/(R4f + R3r) < 2.7 \tag{21-1}$$

$$-10 < (R4r + R4f)/(R4r - R4f) < 0.25 \tag{22-1}$$

$$0.25 < d12/d2 < 4.5 \tag{23-1}$$

$$0.02 < d12/TL < 0.13 \tag{24-1}$$

$$0.35 < H/f1 < 0.78 \tag{25-1}$$

In order to obtain still more favorable properties, it is still more preferable that Conditional Expressions (1) to (25) above are within ranges of Conditional Expressions (1-2) to (25-2) below, respectively.

$$0.38 < H/f < 0.45 \tag{1-2}$$

$$0.08 < (R2r + R2f)/(R2r - R2f) < 0.45 \tag{2-2}$$

$$-0.06 < (R2f - R1r)/(R2f + R1r) < 0.09 \tag{3-2}$$

$$-1.85 < (R1r + R1f)/(R1r - R1f) < -0.55 \tag{4-2}$$

$$-0.87 < (R3r + R3f)/(R3r - R3f) < 2.5 \tag{5-2}$$

$$1.7 < N\text{max} < 1.9 \tag{6-2}$$

$$-2.5 < f/f2 < -1.41 \tag{7-2}$$

$$-0.5 < f/f12 < -0.03 \tag{8-2}$$

$$1.11 < f/fr < 1.6 \tag{9-2}$$

$$-1.8 < f1/f2 < -1.1 \tag{10-2}$$

$$0.84 < f1/fr < 1.31 \tag{11-2}$$

$$-0.82 < f2/fr < -0.58 \tag{12-2}$$

$$0.1 < (R3f - R2r)/(R3f + R2r) < 5 \tag{13-2}$$

$$1.2 < dL/f < 1.8 \tag{14-2}$$

$$0.38 < dL12/T2 < 0.61 \tag{15-2}$$

$$0.23 < H/TL < 0.31 \tag{16-2}$$

$$0.35 < d01/f < 0.58 \tag{17-2}$$

$$-0.94 < H/f2 < -0.59 \tag{18-2}$$

$$0.46 < H/fr < 0.65 \tag{19-2}$$

$$1.02 < f/f1 < 1.71 \tag{20-2}$$

$$-1.83 < (R4f-R3r)/(R4f+R3r) < 2.05 \tag{21-2}$$

$$-6.57 < (R4r+R4f)/(R4r-R4f) < 0.11 \tag{22-2}$$

$$0.32 < d12/d2 < 3.3 \tag{23-2}$$

$$0.03 < d12/TL < 0.115 \tag{24-2}$$

$$0.41 < H/f1 < 0.66 \tag{25-2}$$

Preferable configurations and available configurations in the embodiment described above are available in any combination thereof and are preferably employed appropriately selectively in accordance with required specifications. For example, an observation optical system of one preferable aspect in which the above configurations are combined comprises the display element 1 and the eyepiece lens 3 disposed on the eyepoint side of the display element 1, in which the eyepiece lens 3 includes the first lens L1 having positive optical power, the second lens L2 having negative optical power, and the third lens L3 consecutively in order from closest to the display element side to the eyepoint side, and Conditional Expression (1) is satisfied.

In an observation optical system for a viewfinder such as a digital camera, advances in increasing the number of pixels of a liquid crystal display element have been made in recent years. Thus, a wider visual angle and high resolution performance have been required. However, in a case of obtaining a wider visual angle, various aberrations such as the field curvature and the lateral chromatic aberration significantly occur, and it is difficult to establish both of a wider visual angle and high resolution performance. Therefore, by employing the one preferable aspect, it is possible to implement an observation optical system that enables observation with a wider visual angle, while suppressing various aberrations such as the field curvature and the lateral chromatic aberration.

Next, numerical value examples of the observation optical system according to the embodiment of the present disclosure will be described.

Example 1

A configuration of the observation optical system 5 of Example 1 is illustrated in FIG. 1, and an illustration method thereof and the configuration are described above. Thus, duplicate description will be partially omitted here. The eyepiece lens 3 comprised in the observation optical system 5 of Example 1 consists of four lenses of the first lens L1 to the fourth lens L4 in order from the display element side to the eyepoint side. The first lens L1 is a positive lens having a biconvex shape in a paraxial region. The second lens L2 is a negative lens having a biconcave shape in a paraxial region. The third lens L3 is a negative lens having a meniscus shape of which a concave surface faces toward the display element side in a paraxial region. The fourth lens L4 is a positive lens having a biconvex shape in a paraxial region. All of the first lens L1 to the fourth lens L4 are single lenses. Both surfaces of all of the first lens L1 to the fourth lens L4 are aspherical surfaces. In the diopter adjustment, the four lenses of the first lens L1 to the fourth lens L4 move as a single body.

For the observation optical system 5 of Example 1, basic lens data is shown in Table 1, specifications are shown in Table 2, variable surface spacing is shown in Table 3, and aspherical coefficients are shown in Table 4.

In Table 1, the field Sn shows a surface number of each surface in a case where a surface of the display element 1 on an observed object side (a surface on which the display region 1a is disposed) is referred to as a first surface and the number is increased by one at a time toward the eyepoint side. In Table 1, the display element 1, the optical member 2, the optical member 4, and the eyepoint EP are also disclosed, and a surface number and a word (EP) are disclosed in the field Sn of a surface corresponding to the eyepoint EP. The field R shows a curvature radius of each surface. A sign of the curvature radius is positive for a surface shape of which a convex surface faces toward the display element side, and is negative for a surface shape of which a convex surface faces toward the eyepoint side. A * mark is attached to a surface number of an aspherical surface, and a numerical value of a paraxial curvature radius is disclosed in the field of the curvature radius of the aspherical surface.

In addition, in Table 1, the field D shows surface spacing on the optical axis between each surface and a surface adjacent to the eyepoint side thereof. Variable surface spacing in the diopter adjustment is disclosed using a symbol DD[ ] by attaching a surface number on the display element side of the spacing within [ ]. The field Nd shows a refractive index of each constituent with respect to the d line. The field vd shows a d line-based Abbe number of each constituent.

Table 2 shows the focal length f of the eyepiece lens 3 at each diopter and a value of a visual angle at a full angle of view. In Table 2 and Table, 3, "dpt" means diopter. In the field of the visual angle, [°] means that a unit is degree. In addition, Table 2 shows the half value H of the longest diameter of the display region 1a in the display element 1.

Table 3 shows a value of the variable surface spacing at each diopter. The diopter adjustment can be performed on the observation optical system 5 of Example 1 within a range of −4 dpt to +2 dpt by moving the eyepiece lens 3 in the optical axis direction as a single body.

In Table 4, the field Sn shows the surface number of the aspherical surface. The fields KA and Am (m=3, 4, 5, . . . 16) show numerical values of the aspherical coefficients for each aspherical surface. In Table 4, "E±n" (n: integer) in the numerical values of the aspherical coefficients means "×10$^{\pm n}$". KA and Am are aspherical coefficients in an aspheric equation represented by the following equation.

$$Zd=C \times h^2/\{1+(1-KA \times C^2 \times h^2)^{1/2}\}+\Sigma Am \times h^m$$

where

Zd: depth of aspherical surface (length of vertical line drawn from point on aspherical surface at height h down to plane that is tangential to aspherical surface apex and is perpendicular to optical axis)

h: height (distance from optical axis to lens surface)

C: reciprocal of paraxial curvature radius

KA and Am: aspherical coefficient

In the aspheric equation, $\Sigma$ means a total sum related to m.

In data of each table below, while degree is used as a unit of angle, millimeter (mm) is used as a unit of length, and diopter is used as a unit of diopter, the optical system can also be used by proportionally increasing or proportionally reducing the optical system. Thus, other appropriate units can also be used. In addition, in each table shown below, numerical values rounded in a predetermined number of digits are disclosed.

TABLE 1

| | | Example 1 | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | DD[4] | | |
| *5 | 545.2456 | 4.6570 | 1.77377 | 47.17 |
| *6 | −11.9887 | 2.6437 | | |
| *7 | −12.3344 | 2.3908 | 1.63351 | 23.63 |
| *8 | 17.9071 | 0.6503 | | |
| *9 | −27.9738 | 3.2771 | 1.53389 | 55.98 |
| *10 | −86.7508 | 0.1000 | | |
| *11 | 18.1936 | 5.7631 | 1.77377 | 47.17 |
| *12 | −22.3314 | DD[12] | | |
| 13 | ∞ | 1.2000 | 1.49023 | 57.50 |
| 14 | ∞ | 15.0000 | | |
| 15 (EP) | ∞ | | | |

TABLE 2

| | Example 1 | | | |
|---|---|---|---|---|
| Diopter | −1 dpt | −4 dpt | +2 dpt | 0 dpt |
| f | 20.999 | 20.999 | 20.999 | 20.999 |
| Visual Angle [°] | 43.17 | 42.72 | 43.4 | 43.27 |
| H | 8.198 | | | |

TABLE 3

| | Example 1 | | | |
|---|---|---|---|---|
| Diopter | −1 dpt | −4 dpt | +2 dpt | 0 dpt |
| DD[4] | 4.2513 | 2.9068 | 5.5741 | 4.6930 |
| DD[12] | 2.0673 | 3.4117 | 0.7445 | 1.6256 |

TABLE 4

| | Example 1 | | | |
|---|---|---|---|---|
| Sn | 5 | 6 | 7 | 8 |
| KA | 5.0000000E+00 | 8.1487756E−01 | 7.9523589E−01 | −3.4313619E+00 |
| A3 | 0.0000000E+00 | 0.0000000E+00 | 0.0000000E+00 | 0.0000000E+00 |
| A4 | −1.5363268E−04 | 1.4586242E−04 | −2.7943433E−04 | −5.6316176E−04 |
| A5 | 2.4693702E−06 | 3.3338378E−06 | 3.8943009E−05 | 1.8720402E−06 |
| A6 | 4.0531452E−06 | −5.7539197E−07 | −3.2997323E−06 | 7.4953149E−06 |
| A7 | 1.6215660E−07 | 8.0032953E−07 | −3.8948368E−07 | −1.6697312E−07 |
| A8 | −1.2734319E−07 | −2.3200130E−07 | 7.5480780E−08 | −3.4926690E−08 |
| A9 | 1.1777926E−08 | 3.0941941E−08 | −7.8222979E−10 | −1.8452300E−09 |
| A10 | −2.5369156E−10 | −2.9243540E−09 | −2.9552899E−10 | 4.2638068E−10 |
| A11 | −7.5251757E−11 | 1.9828307E−10 | 2.9087980E−11 | −1.4711864E−11 |
| A12 | 8.7698938E−12 | −9.3877069E−12 | 7.8036898E−13 | 1.5759000E−12 |
| A13 | 6.1102966E−14 | 7.5198580E−13 | −7.8570806E−13 | −3.1681672E−13 |
| A14 | −7.3292431E−14 | −8.4067881E−14 | 9.8363439E−14 | 2.5099605E−14 |
| A15 | 5.0729554E−15 | 4.8770860E−15 | −5.2084604E−15 | −9.2108066E−16 |
| A16 | −1.1471011E−16 | −1.0555511E−16 | 1.0564484E−16 | 1.3651458E−17 |

| | | | | |
|---|---|---|---|---|
| Sn | 9 | 10 | 11 | 12 |
| KA | 2.6422008E+00 | 5.0000026E+00 | 8.8086506E−01 | 9.1213888E−01 |
| A3 | 0.0000000E+00 | 0.0000000E+00 | 0.0000000E+00 | 0.0000000E+00 |
| A4 | 7.1325769E−04 | 2.2826216E−04 | −1.8030075E−04 | 3.3073001E−05 |
| A5 | −2.9211378E−05 | −1.5428236E−06 | 1.0127905E−05 | 1.0740618E−05 |
| A6 | −5.1229689E−06 | −6.3971146E−06 | −1.3682854E−06 | −1.1691214E−06 |
| A7 | 1.3697617E−07 | 2.9861048E−07 | −2.9140430E−07 | −1.2024969E−07 |
| A8 | 5.7371945E−08 | −3.3062288E−08 | 4.5482067E−08 | 1.4486694E−08 |
| A9 | −6.6734072E−09 | 1.4248634E−08 | 1.2039531E−10 | 5.0474055E−10 |
| A10 | 3.0277427E−10 | −1.7000150E−09 | −2.5584889E−10 | −3.5867185E−11 |
| A11 | −2.1586460E−12 | 9.1170570E−11 | 2.8803150E−11 | −6.9419042E−12 |
| A12 | −6.9777638E−13 | −3.6220262E−12 | −2.9335593E−12 | 5.8828819E−13 |
| A13 | 5.4503398E−14 | 2.2100926E−13 | 1.6256131E−13 | −1.8489743E−14 |
| A14 | −8.1296263E−16 | −1.2394153E−14 | −2.9877421E−15 | 5.2926883E−16 |
| A15 | −7.9622463E−17 | 3.8794314E−16 | −5.2738995E−17 | −1.6748493E−17 |
| A16 | 2.7234313E−18 | −5.2909414E−18 | 1.9485766E−18 | 2.0743508E−19 |

Figure 3:
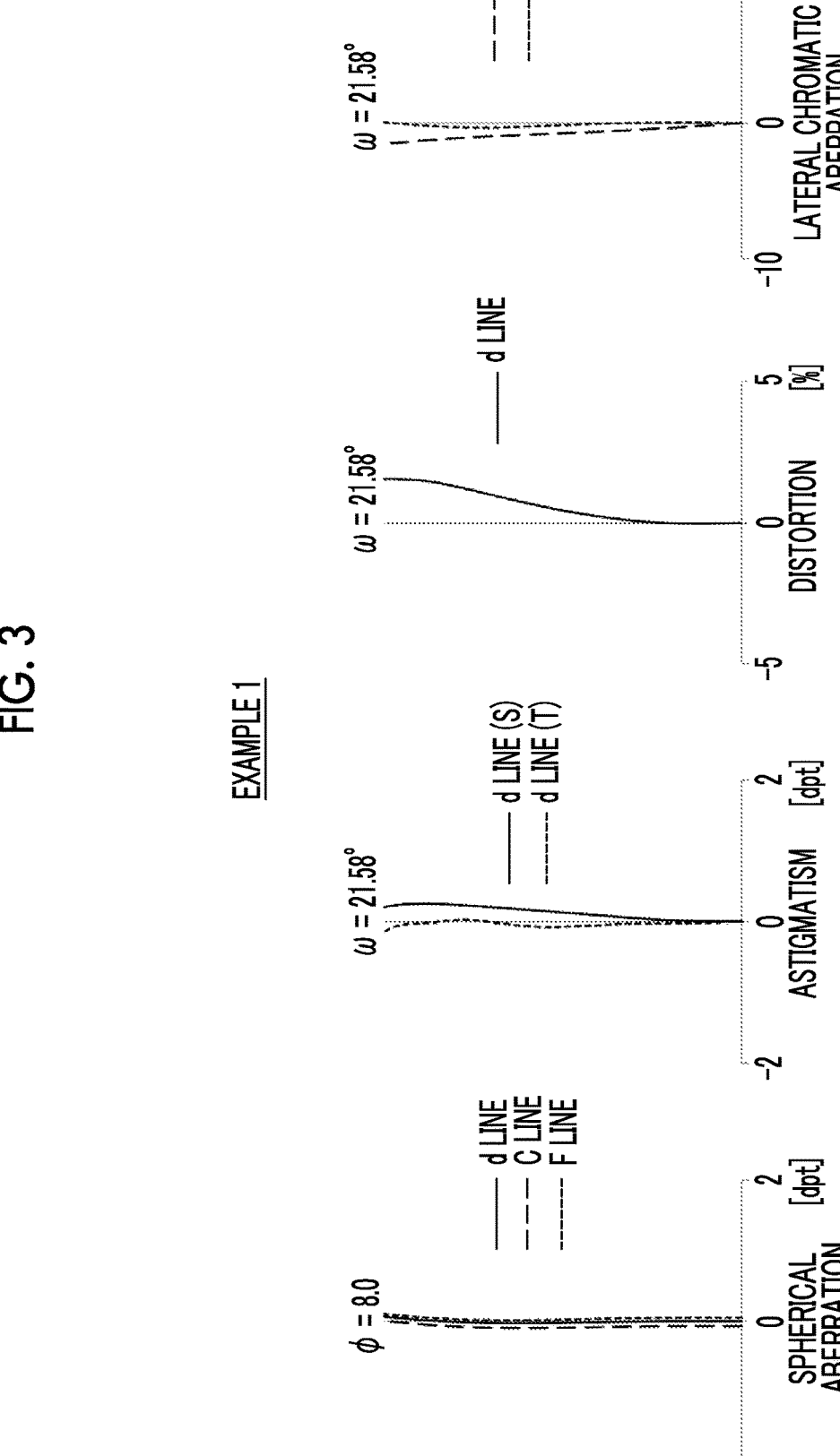
FIG. 3 is a spherical aberration diagram, an astigmatism diagram, a distortion diagram, and a lateral chromatic aberration diagram of the observation optical system of Example 1.
Figure 4:
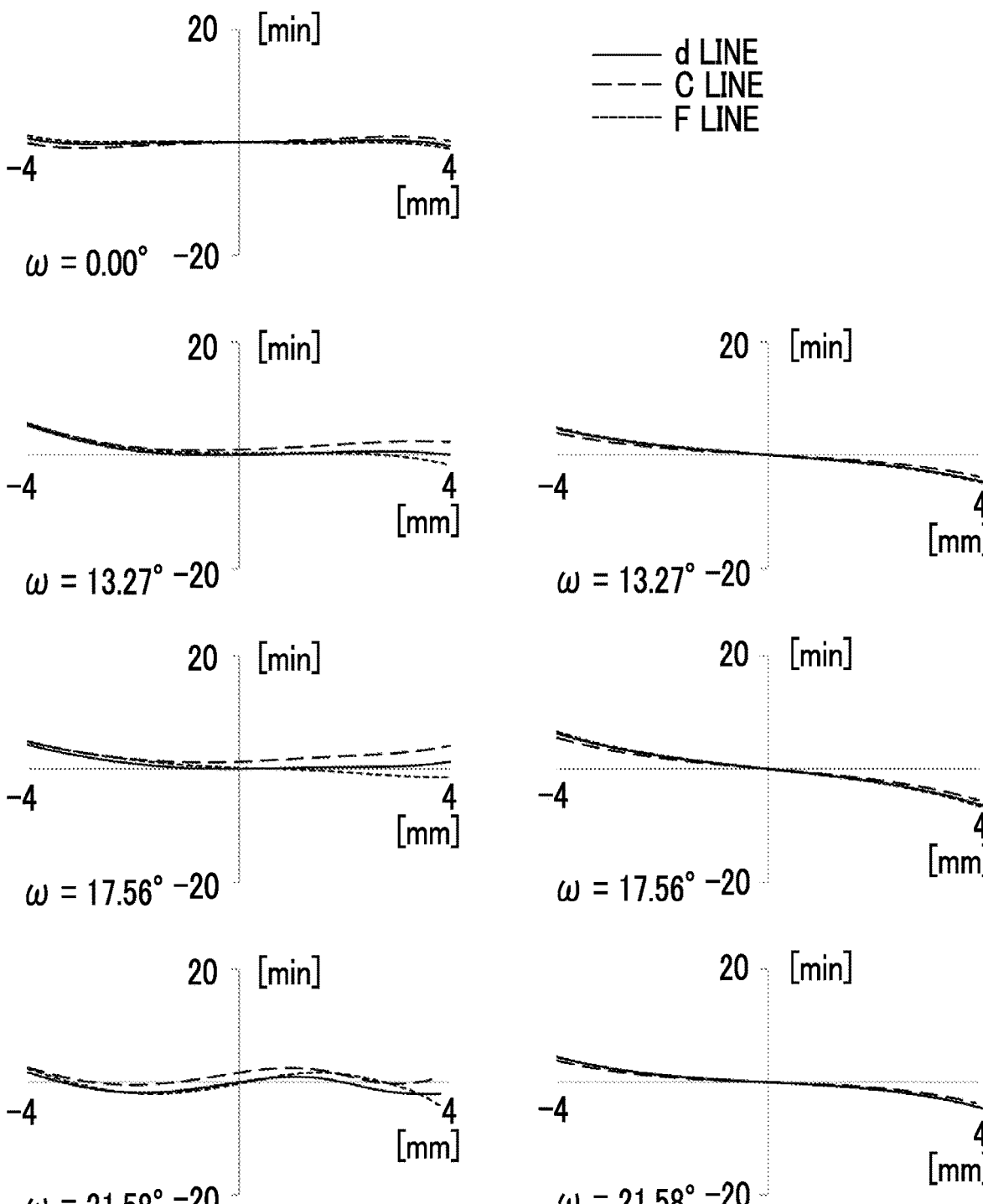
FIG. 4 is a lateral aberration diagram of the observation optical system of Example 1.

FIG. 3 and FIG. 4 illustrate various aberration diagrams of the observation optical system 5 of Example 1 in a state where the diopter is −1.00 diopter. In FIG. 3, a spherical aberration, an astigmatism, a distortion, and a lateral chromatic aberration are illustrated in order from the left. In the spherical aberration diagram, aberrations for the d line, the C line, and the F line are illustrated by a solid line, a long broken line, and a short broken line, respectively. In the astigmatism diagram, the aberration for the d line in a sagittal direction is illustrated by a solid line, and the aberration for the d line in a tangential direction is illustrated by a short broken line. In the distortion diagram, the aberration for the d line is illustrated by a solid line. In the lateral chromatic aberration diagram, the aberrations for the C line and the F line are illustrated by a long broken line and a short broken line, respectively. The unit dpt on a horizontal axis of the spherical aberration diagram and the astigmatism diagram means diopter. In the spherical aberration diagram, $\Phi$ means a diameter of the eyepoint EP in a case where millimeter (mm) is used as a unit. In the other aberration diagrams, ω means the visual angle at a half angle of view.

In FIG. 4, for each visual angle, a lateral aberration in the tangential direction is shown in the left column, and a lateral aberration in the sagittal direction is shown in the right column. In FIG. 4, the aberrations for the d line, the C line, and the F line are illustrated by a solid line, a long broken line, and a short broken line, respectively. In FIG. 4, ω means the visual angle at the half angle of view.

Symbols, meanings, disclosure methods, and illustration methods of each data related to Example 1 are the same as in the following examples unless otherwise specified. Thus, duplicate description will be omitted below.

Example 2

Figure 5:
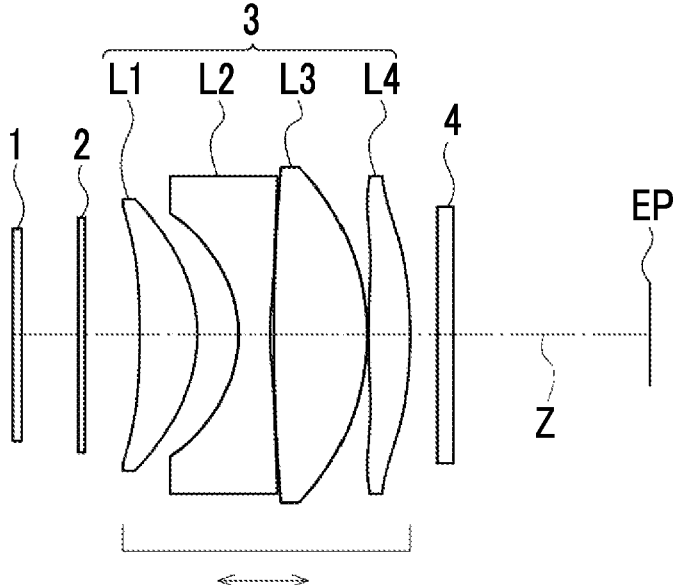
FIG. 5 is a cross-sectional view illustrating a configuration of an observation optical system of Example 2.

FIG. 5 illustrates a configuration of an observation optical system of Example 2. The observation optical system of Example 2 comprises the display element 1, the optical member 2, the eyepiece lens 3, and the optical member 4 in order from the display element side to the eyepoint side.

The eyepiece lens 3 consists of four lenses of the first lens L1 to the fourth lens L4 in order from the display element side to the eyepoint side. The first lens L1 is a positive lens having a meniscus shape of which a concave surface faces toward the display element side in a paraxial region. The second lens L2 is a negative lens having a biconcave shape in a paraxial region. The third lens L3 is a positive lens having a biconvex shape. The fourth lens L4 is a positive lens having a biconvex shape in a paraxial region. All of the first lens L1 to the fourth lens L4 are single lenses. Both surfaces of all of the first lens L1, the second lens L2, and the fourth lens L4 are aspherical surfaces. In the diopter adjustment, the four lenses of the first lens L1 to the fourth lens L4 move as a single body.

Figure 6:
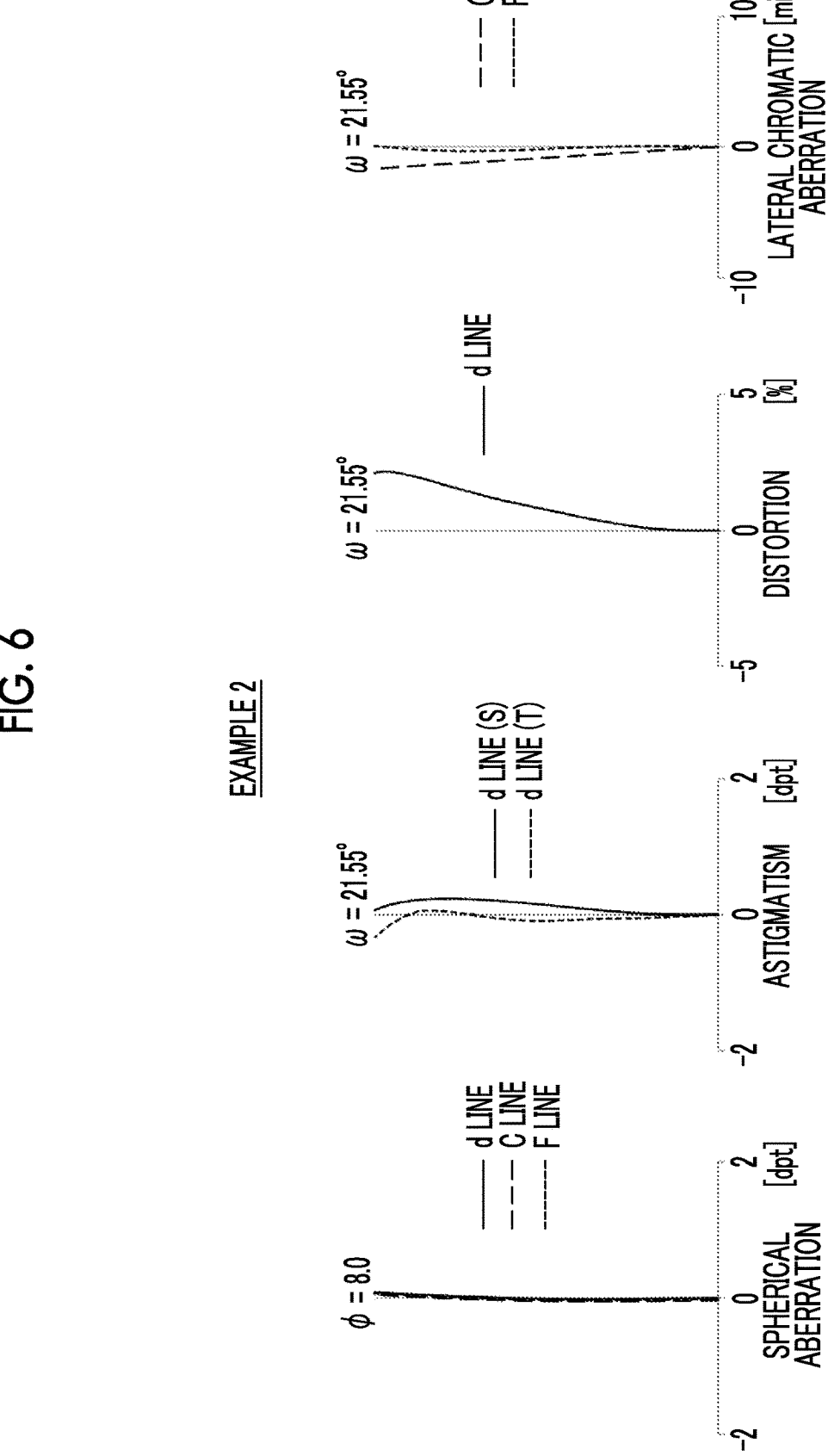
FIG. 6 is a spherical aberration diagram, an astigmatism diagram, a distortion diagram, and a lateral chromatic aberration diagram of the observation optical system of Example 2.
Figure 7:
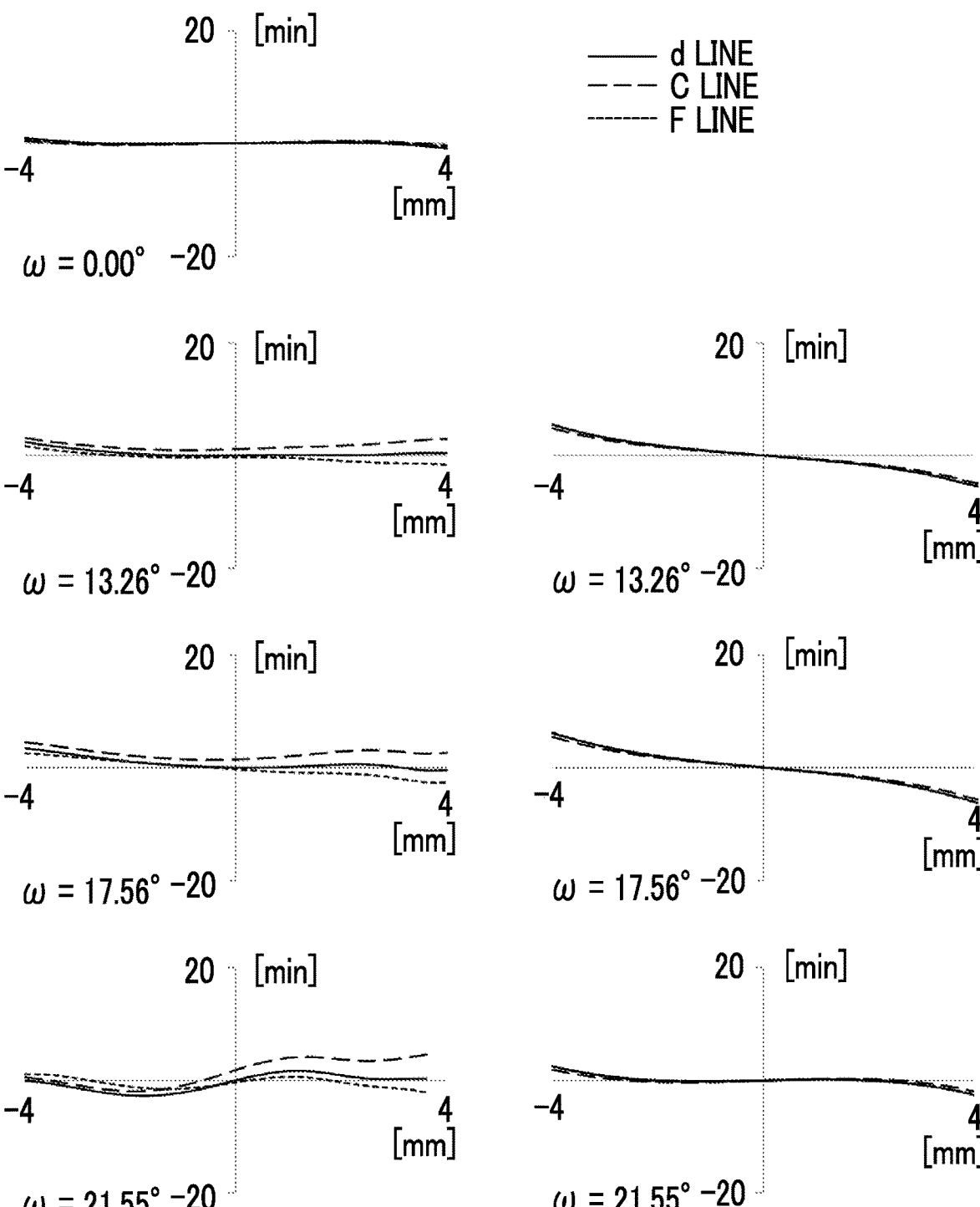
FIG. 7 is a lateral aberration diagram of the observation optical system of Example 2.

For the observation optical system of Example 2, basic lens data is shown in Table 5, specifications are shown in Table 6, variable surface spacing is shown in Table 7, aspherical coefficients are shown in Table 8, and various aberration diagrams are illustrated in FIG. 6 and FIG. 7.

TABLE 5

| | | Example 2 | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | DD[4] | | |
| *5 | −82.6517 | 4.3868 | 1.80610 | 40.73 |
| *6 | −12.2806 | 3.1334 | | |
| *7 | −11.7224 | 2.3952 | 1.63351 | 23.63 |
| *8 | 21.8110 | 0.2950 | | |
| 9 | 157.8230 | 7.0612 | 1.81600 | 46.62 |
| 10 | −19.3020 | 0.1000 | | |
| *11 | 64.0194 | 3.1643 | 1.53389 | 55.98 |
| *12 | −35.7235 | DD[12] | | |
| 13 | ∞ | 1.2000 | 1.49023 | 57.50 |
| 14 | ∞ | 15.0000 | | |
| 15 (EP) | ∞ | | | |

TABLE 6

| | Example 2 | | | |
|---|---|---|---|---|
| Diopter | −1 dpt | −4 dpt | +2 dpt | 0 dpt |
| f | 21.104 | 21.104 | 21.104 | 21.104 |
| Visual Angle [°] | 43.090 | 42.610 | 43.360 | 43.200 |
| H | 8.198 | | | |

TABLE 7

| | Example 2 | | | |
|---|---|---|---|---|
| Diopter | −1 dpt | −4 dpt | +2 dpt | 0 dpt |
| DD[4] | 4.1913 | 2.8364 | 5.5281 | 4.6373 |
| DD[12] | 2.0750 | 3.4300 | 0.7383 | 1.6291 |

TABLE 8

| | | | Example 2 | | | |
|---|---|---|---|---|---|---|
| Sn | 5 | 6 | 7 | 8 | 11 | 12 |
| KA | 5.0000000E+00 | 1.0381980E+00 | 1.0542417E+00 | −2.1953491E+00 | 2.8290926E+00 | 1.1845775E+00 |
| A3 | 0.0000000E+00 | 0.0000000E+00 | 0.0000000E+00 | 0.0000000E+00 | 0.0000000E+00 | 0.0000000E+00 |
| A4 | −1.5796518E−04 | 5.2986114E−05 | −3.6360904E−04 | −6.4033571E−04 | −4.4284885E−05 | 5.7066820E−05 |
| A5 | 4.4467250E−05 | 1.3758807E−05 | −4.4693186E−05 | 3.3840917E−06 | 2.2118250E−05 | −1.9450801E−07 |
| A6 | −4.9666109E−06 | −3.5520604E−06 | 1.5761260E−05 | 1.0208311E−05 | −8.3514293E−06 | −1.1775103E−06 |
| A7 | −1.6096116E−06 | 6.7426885E−08 | 1.4545605E−06 | 1.2959266E−07 | −5.9051826E−08 | −1.1141069E−06 |
| A8 | 4.1281566E−07 | 4.0591706E−08 | −4.8981618E−07 | −1.3727736E−07 | 1.0170498E−07 | 2.7092164E−07 |
| A9 | −3.3643229E−08 | −1.1807646E−10 | 3.9413923E−08 | 6.3243745E−09 | 2.8291907E−09 | −2.2305382E−08 |
| A10 | 9.9572031E−10 | −2.0859744E−10 | −1.3700366E−09 | 4.4049918E−11 | −8.1001898E−10 | 3.9555675E−10 |
| A11 | 1.1355215E−10 | −2.2305238E−11 | −2.5469503E−10 | −4.7889949E−12 | −1.2906250E−12 | 8.8445688E−11 |
| A12 | −2.4628993E−11 | 3.6439405E−12 | 6.5301024E−11 | 2.8910871E−12 | −2.5487639E−12 | −6.3348837E−12 |

TABLE 8-continued

| | | | Example 2 | | | |
|---|---|---|---|---|---|
| A13 | 1.3115463E-12 | -1.2202878E-13 | -5.9442797E-12 | -4.3597062E-13 | 9.2572699E-13 | -4.8389727E-13 |
| A14 | 6.1801710E-14 | -2.7125381E-15 | 2.2091369E-13 | 2.4043496E-14 | -7.4308222E-14 | 8.9207111E-14 |
| A15 | -8.3219755E-15 | 2.8574394E-16 | -5.4364915E-16 | -5.5770800E-16 | 2.5892047E-15 | -4.6228676E-15 |
| A16 | 2.2421661E-16 | -6.3837449E-18 | -1.1941466E-16 | 4.2809839E-18 | -3.6135194E-17 | 8.4646583E-17 |

Example 3

Figure 8:
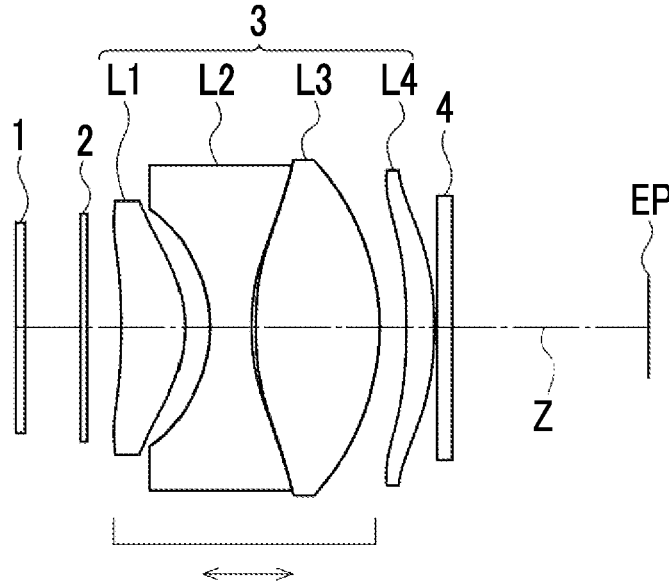
FIG. 8 is a cross-sectional view illustrating a configuration of an observation optical system of Example 3.

FIG. 8 illustrates a configuration of an observation optical system of Example 3. The observation optical system of Example 3 comprises the display element 1, the optical member 2, the eyepiece lens 3, and the optical member 4 in order from the display element side to the eyepoint side.

The eyepiece lens 3 consists of four lenses of the first lens L1 to the fourth lens L4 in order from the display element side to the eyepoint side. The first lens L1 is a positive lens having a meniscus shape of which a concave surface faces toward the display element side in a paraxial region. The second lens L2 is a negative lens having a biconcave shape in a paraxial region. The third lens L3 is a positive lens having a biconvex shape in a paraxial region. The fourth lens L4 is a positive lens having a meniscus shape of which a concave surface faces toward the display element side in a paraxial region. All of the first lens L1 to the fourth lens L4 are single lenses. Both surfaces of all of the first lens L1 to the fourth lens L4 are aspherical surfaces. In the diopter adjustment, three lenses of the first lens L1 to the third lens L3 move as a single body, and the fourth lens L4 does not move.

Figure 9:
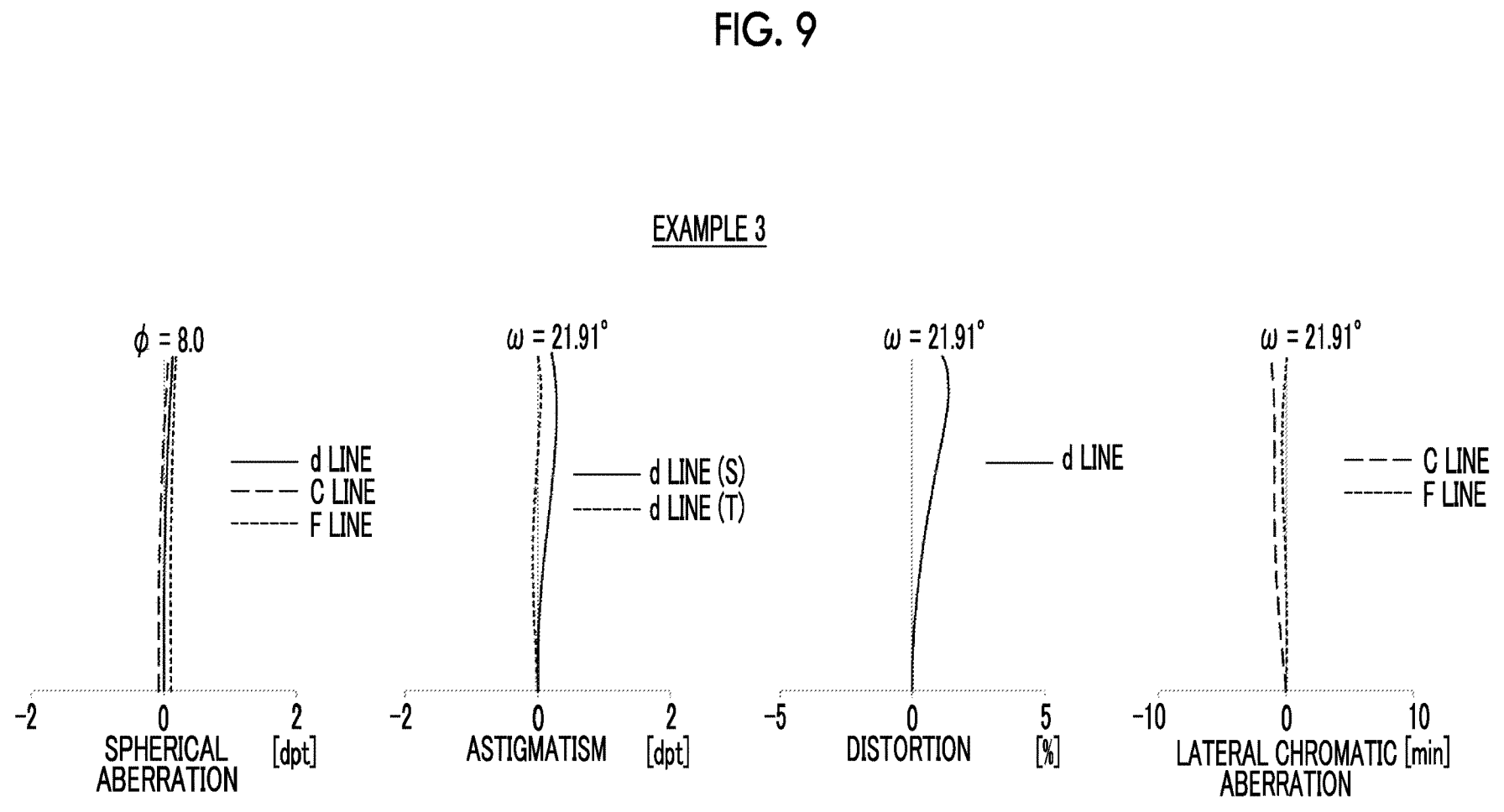
Figure 10:
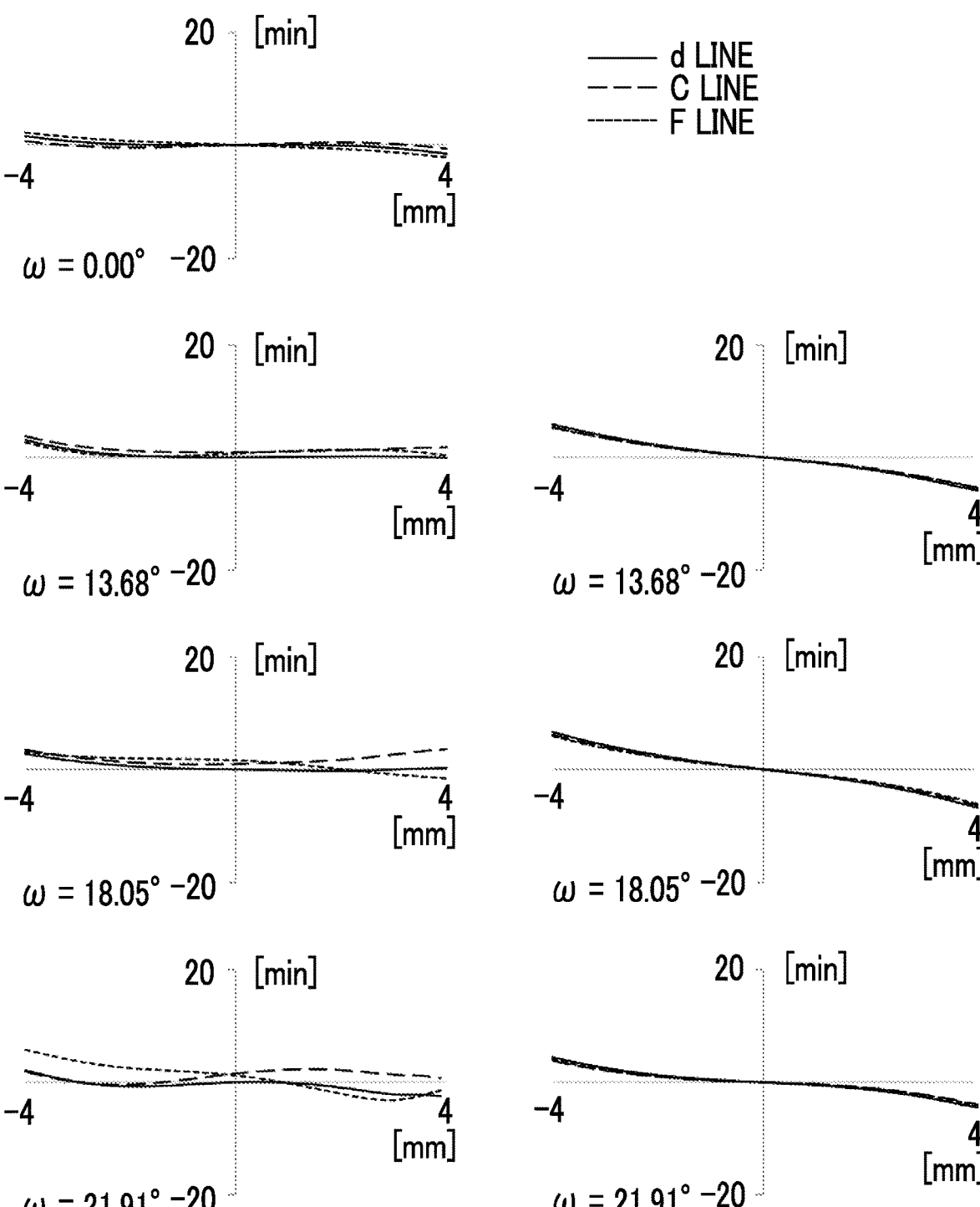
FIG. 10 is a lateral aberration diagram of the observation optical system of Example 3.

For the observation optical system of Example 3, basic lens data is shown in Table 9, specifications are shown in Table 10, variable surface spacing is shown in Table 11, aspherical coefficients are shown in Table 12, and various aberration diagrams are illustrated in FIG. 9 and FIG. 10.

TABLE 9

| | | Example 3 | | |
|---|---|---|---|---|
| Sn | R | D | Nd | vd |
| 1 | ∞ | 0.7000 | 1.51680 | 64.20 |
| 2 | ∞ | 4.3000 | | |

TABLE 9-continued

| | | Example 3 | | |
|---|---|---|---|---|
| Sn | R | D | Nd | vd |
| 3 | ∞ | 0.5000 | 1.49023 | 57.49 |
| 4 | ∞ | DD[4] | | |
| *5 | -61.8791 | 4.8406 | 1.80610 | 40.73 |
| *6 | -10.9441 | 1.9287 | | |
| *7 | -11.4445 | 3.1618 | 1.63351 | 23.63 |
| *8 | 21.5347 | 0.3572 | | |
| *9 | 42.6636 | 9.5112 | 1.82080 | 42.71 |
| *10 | -18.5475 | DD[10] | | |
| *11 | -68.6541 | 2.1595 | 1.53389 | 55.98 |
| *12 | -30.7123 | 0.2000 | | |
| 13 | ∞ | 1.2000 | 1.49023 | 57.50 |
| 14 | ∞ | 15.0000 | | |
| 15 (EP) | ∞ | | | |

TABLE 10

| | | Example 3 | | |
|---|---|---|---|---|
| Diopter | -1 dpt | -4 dpt | +2 dpt | 0 dpt |
| f | 20.380 | 20.616 | 20.162 | 20.306 |
| Visual Angle [°] | 43.830 | 42.950 | 44.590 | 44.090 |
| H | 8.198 | | | |

TABLE 11

| | | Example 3 | | |
|---|---|---|---|---|
| Diopter | -1 dpt | -4 dpt | +2 dpt | 0 dpt |
| DD[4] | 2.6149 | 1.2622 | 3.8940 | 3.0478 |
| DD[10] | 2.0285 | 3.3811 | 0.7494 | 1.5955 |

TABLE 12

| | | Example 3 | | |
|---|---|---|---|---|
| Sn | 5 | 6 | 7 | 8 |
| KA | -3.9723538E+00 | 9.7951734E-01 | 1.0216808E+00 | 4.8756306E-01 |
| A3 | 0.0000000E+00 | 0.0000000E+00 | 0.0000000E+00 | 0.0000000E+00 |
| A4 | -2.1095154E-04 | -7.4748296E-05 | -3.3792604E-04 | 3.0720116E-04 |
| A5 | 4.2528040E-05 | 6.6420323E-05 | 9.5977892E-05 | -3.4111737E-06 |
| A6 | -6.4512258E-06 | -5.5101812E-06 | -4.1761458E-06 | -7.2281543E-06 |
| A7 | 2.2383771E-07 | -2.6285451E-07 | -3.7072040E-07 | 2.2158445E-07 |
| A8 | 6.0527916E-08 | 7.3925326E-08 | -4.9008420E-08 | 2.4706140E-08 |
| A9 | 8.3852026E-09 | 3.1734849E-10 | 1.2796043E-08 | 3.2863377E-09 |
| A10 | -2.6670393E-09 | -3.5339155E-10 | 2.2936826E-09 | -4.1529600E-10 |
| A11 | 2.5359357E-10 | 2.1162746E-11 | -9.1975308E-10 | 7.8760905E-12 |
| A12 | -2.2777223E-11 | -3.5021960E-12 | 1.1205808E-10 | -3.3388086E-12 |
| A13 | 2.2319250E-12 | 3.9841261E-13 | -5.8219309E-12 | 6.7887932E-13 |
| A14 | -1.5076608E-13 | -1.9544766E-14 | 1.6970154E-15 | -5.2601770E-14 |
| A15 | 5.8059269E-15 | 3.6865867E-16 | 1.3237373E-14 | 1.9390914E-15 |
| A16 | -9.9772941E-17 | -3.1780775E-19 | -4.2415428E-16 | -2.8991991E-17 |

TABLE 12-continued

| Sn | 9 | 10 | 11 | 12 |
|---|---|---|---|---|
| | | Example 3 | | |
| KA | −3.6970382E+00 | 9.8920463E−01 | 3.3688611E+00 | 3.8969960E+00 |
| A3 | 0.0000000E+00 | 0.0000000E+00 | 0.0000000E+00 | 0.0000000E+00 |
| A4 | 4.9990458E−04 | 1.5568843E−05 | −2.1466428E−04 | −1.4922144E−04 |
| A5 | −7.0530501E−06 | 3.3018076E−06 | 9.9465835E−06 | 3.0310129E−06 |
| A6 | −8.3875325E−06 | −7.2335335E−08 | 6.6519615E−07 | 8.5977918E−07 |
| A7 | 3.3599286E−07 | −3.6943510E−08 | −1.0091057E−07 | 2.0885214E−08 |
| A8 | −1.2292484E−09 | 9.7367195E−10 | 1.4558348E−08 | −2.4808798E−09 |
| A9 | 8.9733150E−09 | −2.9159891E−11 | −7.0706151E−10 | 2.3930314E−10 |
| A10 | −1.1466220E−09 | 2.3911832E−11 | 9.8535317E−11 | −5.4705545E−11 |
| A11 | 4.7541044E−11 | −1.8041655E−12 | −1.5722671E−11 | 7.1481672E−12 |
| A12 | −5.4253937E−13 | 3.1486344E−14 | 5.9451261E−13 | −1.2944616E−13 |
| A13 | 3.1897435E−14 | 9.6869463E−16 | 4.5775287E−14 | −6.0685397E−14 |
| A14 | −4.5561023E−15 | −5.9415717E−17 | −5.0076785E−15 | 5.9061134E−15 |
| A15 | 2.1113442E−16 | 1.9054197E−18 | 1.8467742E−16 | −2.2070165E−16 |
| A16 | −3.6598959E−18 | −2.8645319E−20 | −2.6660152E−18 | 3.1445507E−18 |

Example 4

Figure 11:
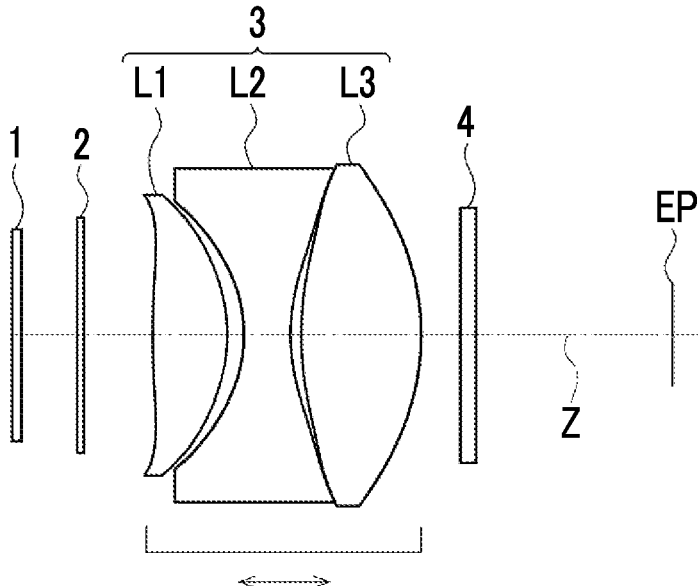
FIG. 11 is a cross-sectional view illustrating a configuration of an observation optical system of Example 4.

FIG. 11 illustrates a configuration of an observation optical system of Example 4. The observation optical system of Example 4 comprises the display element 1, the optical member 2, the eyepiece lens 3, and the optical member 4 in order from the display element side to the eyepoint side.

The eyepiece lens 3 consists of three lenses of the first lens L1 to the third lens L3 in order from the display element side to the eyepoint side. The first lens L1 is a positive lens having a biconvex shape in a paraxial region. The second lens L2 is a negative lens having a biconcave shape in a paraxial region. The third lens L3 is a positive lens having a biconvex shape in a paraxial region. All of the first lens L1 to the third lens L3 are single lenses. Both surfaces of all of the first lens L1 to the third lens L3 are aspherical surfaces. In the diopter adjustment, the three lenses of the first lens L1 to the third lens L3 move as a single body.

Figure 12:
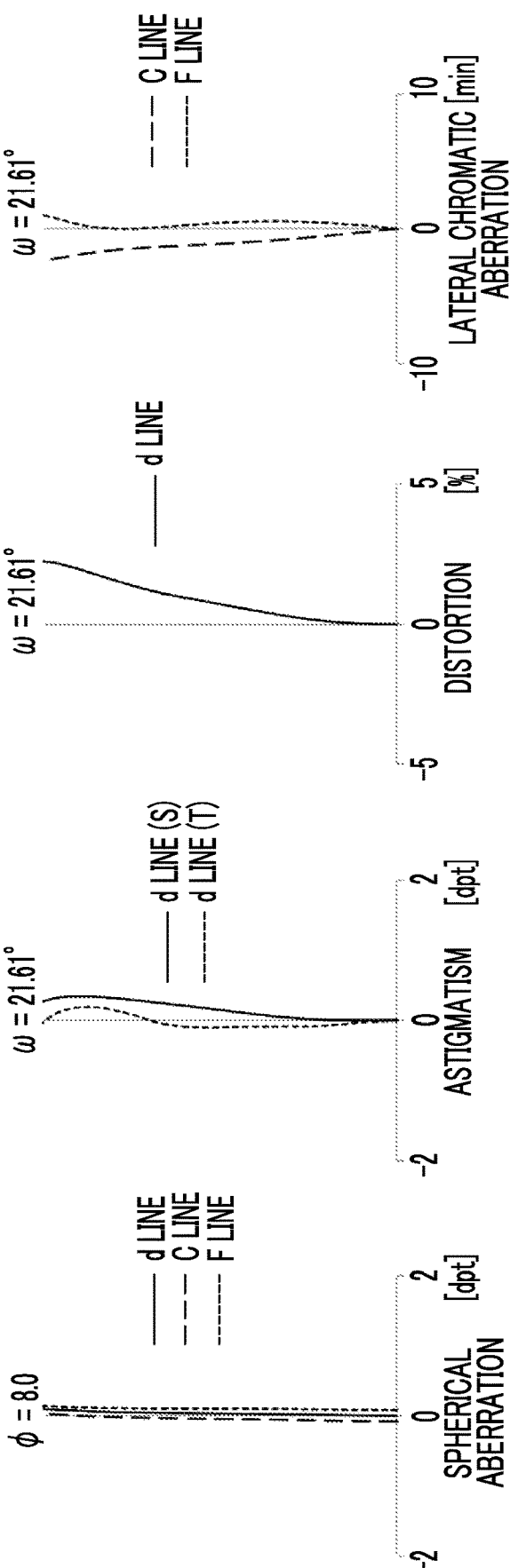
FIG. 12 is a spherical aberration diagram, an astigmatism diagram, a distortion diagram, and a lateral chromatic aberration diagram of the observation optical system of Example 4.
Figure 13:
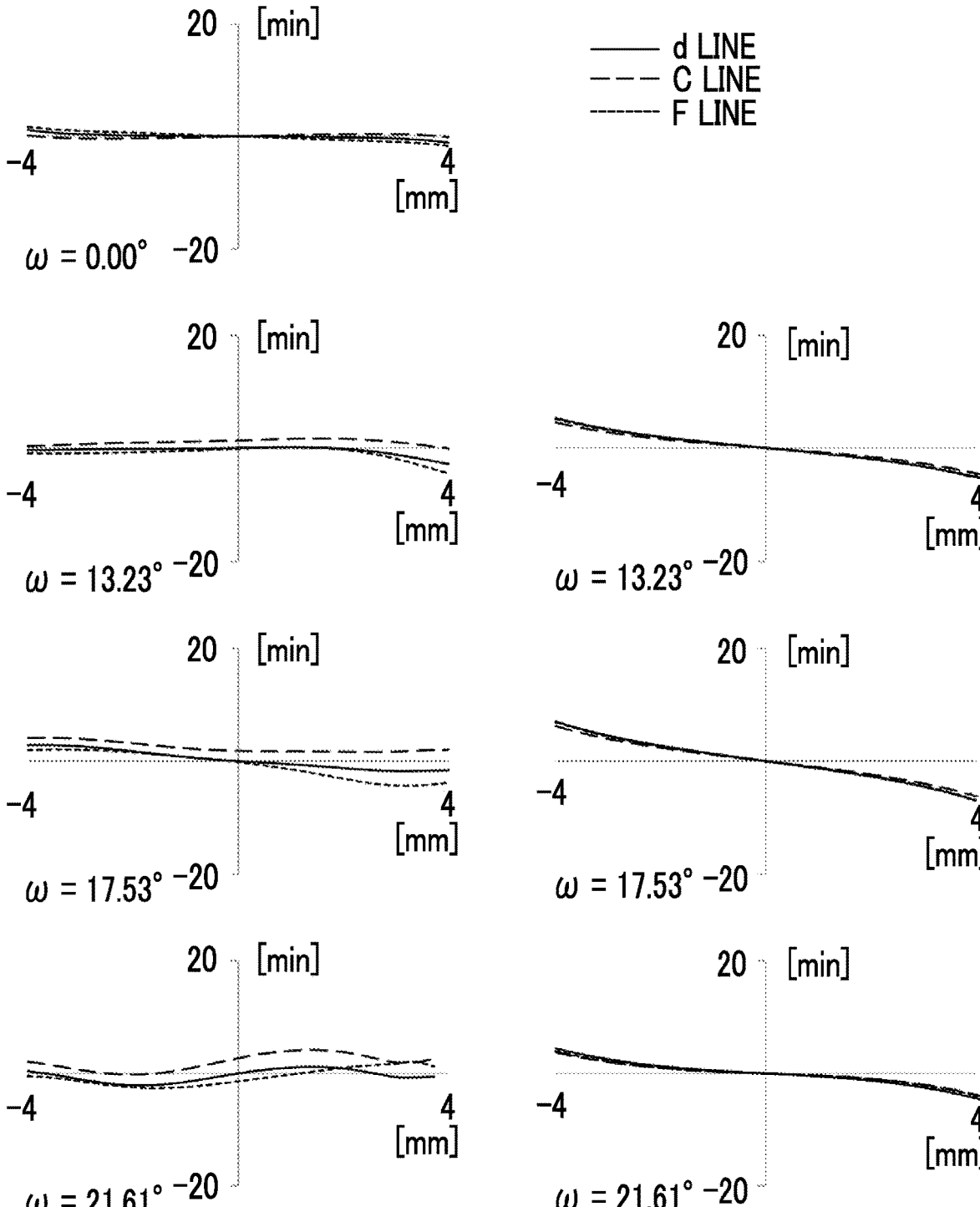
FIG. 13 is a lateral aberration diagram of the observation optical system of Example 4.

For the observation optical system of Example 4, basic lens data is shown in Table 13, specifications are shown in Table 14, variable surface spacing is shown in Table 15, aspherical coefficients are shown in Table 16, and various aberration diagrams are illustrated in FIG. 12 and FIG. 13.

TABLE 13

| | | Example 4 | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | DD[4] | | |

TABLE 13-continued

| | | Example 4 | | |
|---|---|---|---|---|
| Sn | R | D | Nd | vd |
| *5 | 62.1413 | 5.6525 | 1.80610 | 40.73 |
| *6 | −14.2237 | 1.2716 | | |
| *7 | −12.7867 | 3.5815 | 1.63351 | 23.63 |
| *8 | 15.5221 | 0.8391 | | |
| *9 | 30.2377 | 9.1895 | 1.85135 | 40.10 |
| *10 | −19.3082 | DD[10] | | |
| 11 | ∞ | 1.2000 | 1.49023 | 57.50 |
| 12 | ∞ | 15.0000 | | |
| 13 (EP) | ∞ | | | |

TABLE 14

| | | Example 4 | | |
|---|---|---|---|---|
| Diopter | −1 dpt | −4 dpt | +2 dpt | 0 dpt |
| f | 21.098 | 21.098 | 21.098 | 21.098 |
| Visual Angle [°] | 43.220 | 42.760 | 43.450 | 43.330 |
| H | 8.198 | | | |

TABLE 15

| | | Example 4 | | |
|---|---|---|---|---|
| Diopter | −1 dpt | −4 dpt | +2 dpt | 0 dpt |
| DD[4] | 5.2697 | 3.9056 | 6.6039 | 5.7161 |
| DD[10] | 2.9964 | 4.3605 | 1.6623 | 2.5501 |

TABLE 16

| | | | Example 4 | |
|---|---|---|---|---|
| Sn | 5 | 6 | 7 | 8 |
| KA | 2.2784436E+00 | 1.0205866E+00 | 9.8102392E−01 | −2.2594404E+00 |
| A3 | 0.0000000E+00 | 0.0000000E+00 | 0.0000000E+00 | 0.0000000E+00 |
| A4 | 4.9153212E−06 | −1.06403 84E−04 | −4.8657657E−04 | 1.0067046E−04 |
| A5 | −5.1104436E−06 | 1.9657962E−05 | 4.5339858E−05 | 8.1304214E−06 |
| A6 | −1.5755575E−06 | 2.4044789E−08 | 8.1576816E−06 | −9.9780674E−06 |
| A7 | −4.3632320E−08 | 4.6497626E−09 | −3.0874558E−07 | 1.8420053E−06 |
| A8 | 1.6180705E−08 | −1.2027421E−08 | −1.1229143E−07 | −2.7343402E−07 |
| A9 | 4.6215077E−09 | 3.8268937E−10 | −2.9308417E−09 | 2.6975779E−08 |
| A10 | −3.8866945E−10 | 8.5272220E−11 | 1.7623706E−09 | −4.0825045E−10 |

TABLE 16-continued

| | Example 4 | | | |
|---|---|---|---|---|
| A11 | −5.8153364E−11 | −2.4575577E−11 | −3.6509898E−11 | −1.2820527E−10 |
| A12 | 4.7430083E−12 | 2.4053297E−12 | −1.6782177E−11 | −1.0065396E−12 |
| A13 | 4.5535809E−13 | −2.1017573E−14 | 2.5533064E−12 | 2.0470717E−12 |
| A14 | −7.3124592E−14 | −9.9953176E−15 | −2.0378068E−13 | −1.9600723E−13 |
| A15 | 3.7178356E−15 | 6.1889488E−16 | 8.7474420E−15 | 7.9548850E−15 |
| A16 | −7.1695905E−17 | −1.2228114E−17 | −1.5480384E−16 | −1.2487101E−16 |

| Sn | 9 | 10 |
|---|---|---|
| KA | −1.4604298E+00 | 9.8702136E−01 |
| A3 | 0.0000000E+00 | 0.0000000E+00 |
| A4 | 1.7204759E−04 | −3.5955593E−07 |
| A5 | 7.6035315E−06 | 7.4932960E−06 |
| A6 | −6.7343859E−06 | −6.9664275E−07 |
| A7 | 2.8388954E−07 | −7.1012774E−08 |
| A8 | 1.2911638E−09 | 1.5894762E−08 |
| A9 | 4.6461301E−09 | −1.4264348E−09 |
| A10 | −1.4267830E−10 | 8.8109895E−11 |
| A11 | −5.8493357E−11 | 1.0473690E−12 |
| A12 | 4.1717494E−12 | −7.8919922E−13 |
| A13 | 1.3516119E−13 | 6.8456671E−14 |
| A14 | −2.7073605E−14 | −3.0530116E−15 |
| A15 | 1.2253320E−15 | 7.8738917E−17 |
| A16 | −1.9867596E−17 | −9.5556824E−19 |

Example 5

Figure 14:
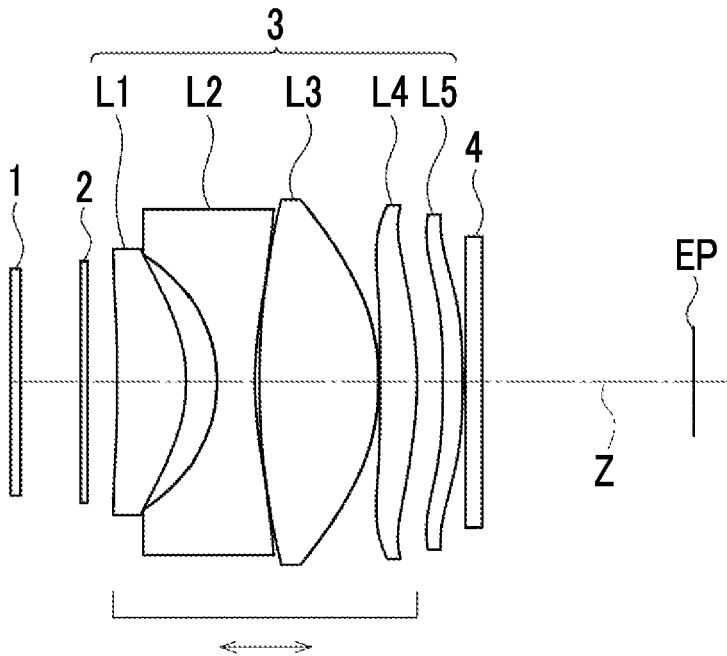
FIG. 14 is a cross-sectional view illustrating a configuration of an observation optical system of Example 5.

FIG. 14 illustrates a configuration of an observation optical system of Example 5. The observation optical system of Example 5 comprises the display element 1, the optical member 2, the eyepiece lens 3, and the optical member 4 in order from the display element side to the eyepoint side.

The eyepiece lens 3 consists of five lenses of the first lens L1 to a fifth lens L5 in order from the display element side to the eyepoint side. The first lens L1 is a positive lens having a meniscus shape of which a concave surface faces toward the display element side in a paraxial region. The second lens L2 is a negative lens having a biconcave shape in a paraxial region. The third lens L3 is a positive lens having a biconvex shape in a paraxial region. The fourth lens L4 is a positive lens having a meniscus shape of which a concave surface faces toward the display element side in a paraxial region. The fifth lens L5 is a positive lens having a meniscus shape of which a concave surface faces toward the display element side in a paraxial region. Both surfaces of all of the first lens L1 to the fifth lens L5 are aspherical surfaces. In the diopter adjustment, four lenses of the first lens L1 to the fourth lens L4 move as a single body, and the fifth lens L5 does not move.

Figure 15:
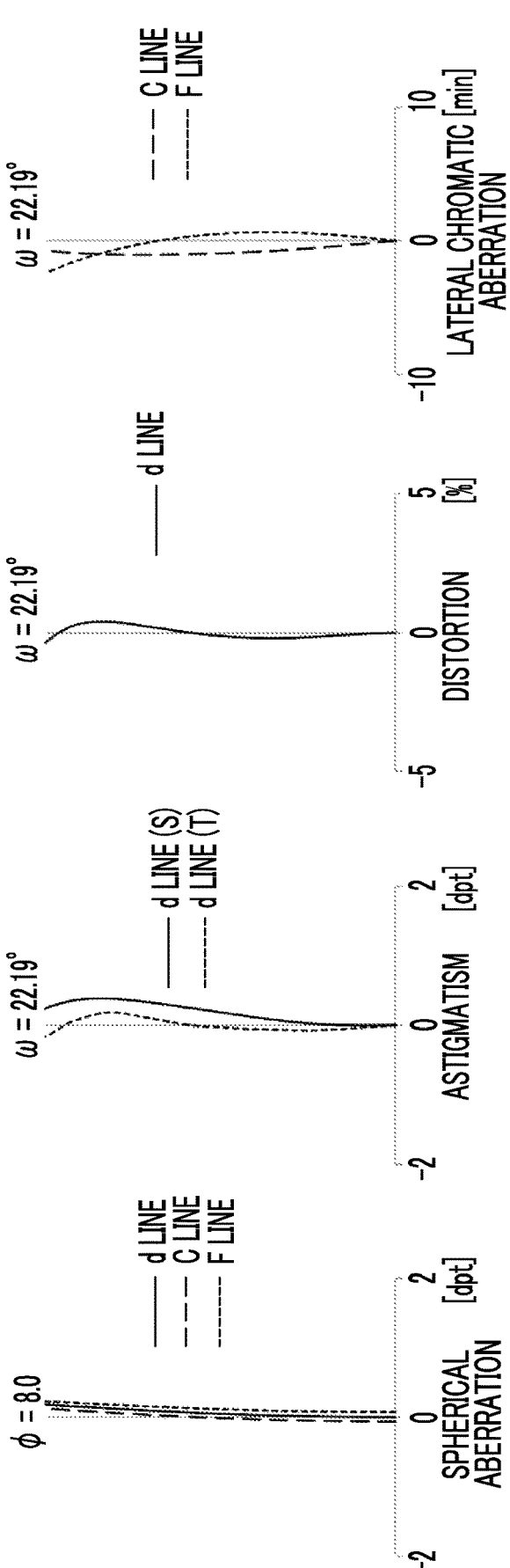
FIG. 15 is a spherical aberration diagram, an astigmatism diagram, a distortion diagram, and a lateral chromatic aberration diagram of the observation optical system of Example 5.
Figure 16:
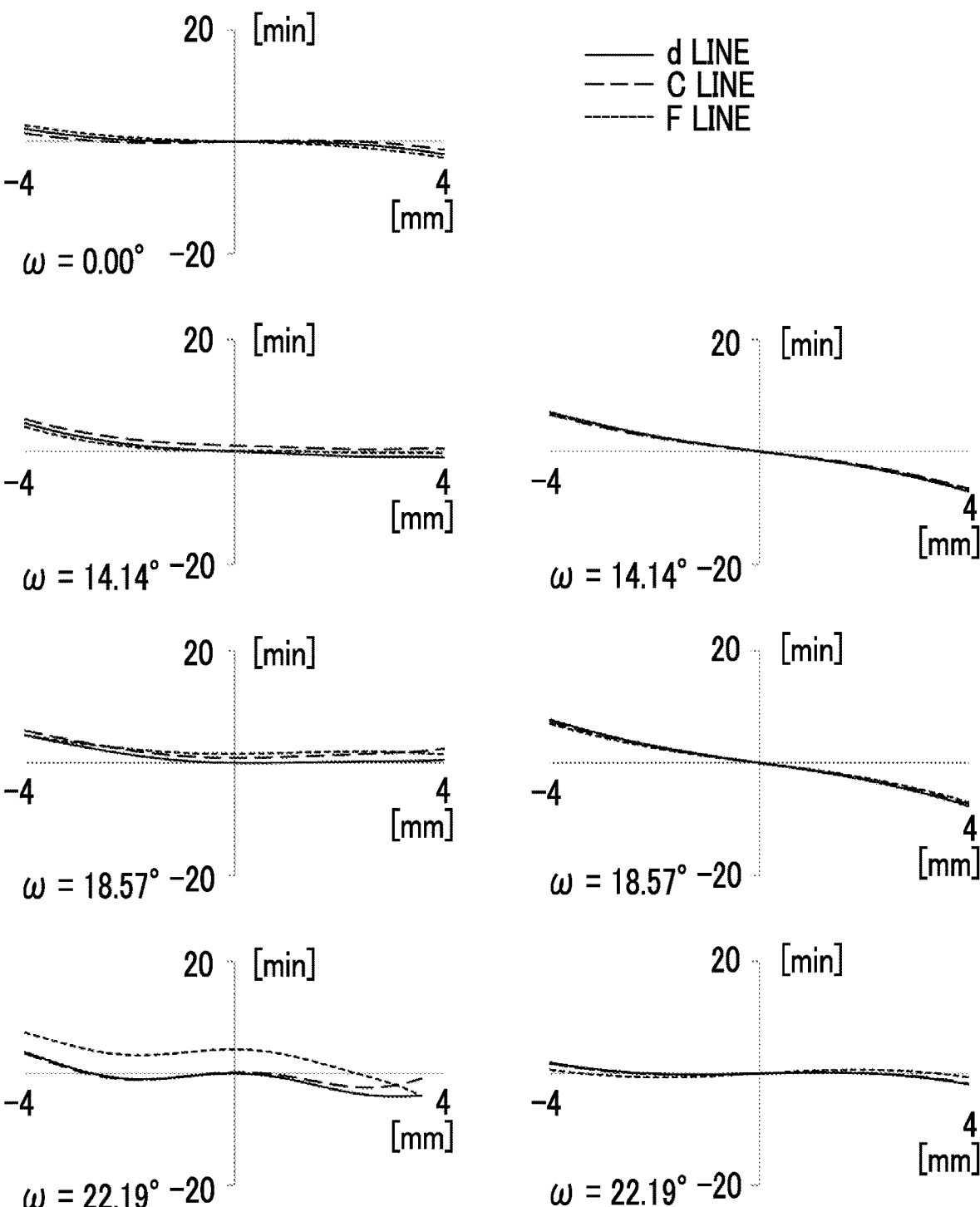
FIG. 16 is a lateral aberration diagram of the observation optical system of Example 5.

For the observation optical system of Example 5, basic lens data is shown in Table 17, specifications are shown in Table 18, variable surface spacing is shown in Table 19, aspherical coefficients are shown in Table 20, and various aberration diagrams are illustrated in FIG. 15 and FIG. 16.

TABLE 17

| | Example 5 | | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | DD[4] | | |

TABLE 17-continued

| | Example 5 | | | |
|---|---|---|---|---|
| Sn | R | D | Nd | vd |
| *5 | −342.4992 | 4.9033 | 1.80610 | 40.73 |
| *6 | −11.9810 | 2.1397 | | |
| *7 | −11.4485 | 2.6885 | 1.63351 | 23.63 |
| *8 | 27.5255 | 0.3473 | | |
| *9 | 166.2941 | 8.4797 | 1.77250 | 49.46 |
| *10 | −19.6296 | 0.1000 | | |
| *11 | −1739.9303 | 2.6196 | 1.53389 | 55.98 |
| *12 | −25.3592 | DD[12] | | |
| *13 | −118.1145 | 1.4050 | 1.53389 | 55.98 |
| *14 | −88.2153 | 0.2000 | | |
| 15 | ∞ | 1.2000 | 1.49023 | 57.50 |
| 16 | ∞ | 15.0000 | | |
| 17 (EP) | ∞ | | | |

TABLE 18]

| | Example 5 | | | |
|---|---|---|---|---|
| Diopter | −1 dpt | −4 dpt | +2 dpt | 0 dpt |
| f | 19.494 | 19.530 | 19.461 | 19.483 |
| Visual Angle [°] | 44.380 | 43.800 | 44.840 | 44.540 |
| H | 8.198 | | | |

TABLE 19

| | Example 5 | | | |
|---|---|---|---|---|
| Diopter | −1 dpt | −4 dpt | +2 dpt | 0 dpt |
| DD[4] | 2.0948 | 0.9194 | 3.2308 | 2.4766 |
| DD[12] | 1.8282 | 3.0037 | 0.6922 | 1.4464 |

TABLE 20

| Example 5 | | | |
| --- | --- | --- | --- |
| Sn | 5 | 6 | 7 | 8 |
| --- | --- | --- | --- | --- |
| KA | 5.0000001E+00 | 9.8883711E-01 | 1.0365774E+00 | 5.2965544E-01 |
| A3 | 0.0000000E+00 | 0.0000000E+00 | 0.0000000E+00 | 0.0000000E+00 |
| A4 | -1.6414507E-04 | 7.1225053E-05 | -2.0150255E-04 | -5.0296467E-05 |
| A5 | 6.0470889E-07 | 7.9836653E-06 | 1.5061595E-05 | -7.6146707E-06 |
| A6 | 2.1813069E-06 | -4.3174489E-07 | 1.4132996E-06 | -1.2648910E-07 |
| A7 | 7.1913308E-08 | 6.0579542E-08 | -2.9760405E-07 | 6.0716474E-08 |
| A8 | -7.2018448E-09 | 1.0558957E-08 | 4.4835278E-08 | 5.0890945E-09 |
| A9 | 2.5562816E-09 | 9.5186785E-09 | -4.6867177E-09 | -3.1524635E-10 |
| A10 | -1.0245337E-09 | -6.2691050E-10 | 5.8672437E-10 | -2.7846038E-11 |
| A11 | 1.1957011E-10 | 9.2173934E-11 | -8.5538079E-11 | -8.1444922E-13 |
| A12 | -5.4558805E-12 | -5.2353930E-12 | 4.7214253E-12 | 3.0188572E-13 |
| A13 | -3.0429354E-13 | -2.9064323E-13 | 1.9684707E-13 | -1.3865781E-14 |
| A14 | 6.6813989E-14 | 6.5988164E-14 | -3.6341636E-14 | 3.7264161E-16 |
| A15 | -4.1238482E-15 | -4.0126511E-15 | 1.7541927E-15 | -1.4550196E-17 |
| A16 | 9.1828892E-17 | 8.8352375E-17 | -3.2105750E-17 | 3.1239267E-19 |

| Sn | 9 | 10 | 11 | 12 |
| --- | --- | --- | --- | --- |
| KA | -5.0000006E+00 | 9.8203375E-01 | 4.9999999E+00 | 8.3153946E-01 |
| A3 | 0.0000000E+00 | 0.0000000E+00 | 0.0000000E+00 | 0.0000000E+00 |
| A4 | 2.5180229E-04 | -1.9884970E-04 | -1.4410462E-04 | 2.5045174E-04 |
| A5 | 9.3431394E-07 | 1.8366612E-06 | 1.1791454E-05 | -5.0276508E-06 |
| A6 | -5.2801308E-06 | 2.7498334E-06 | -7.7715430E-07 | -4.3051835E-06 |
| A7 | 2.5693355E-07 | -1.1639290E-08 | 5.6555284E-08 | 1.9708892E-07 |
| A8 | 2.6119763E-09 | -2.1177138E-08 | -8.5892259E-09 | 2.3310169E-08 |
| A9 | 1.5801170E-09 | -1.6821384E-11 | 4.3688888E-09 | -7.0278397E-10 |
| A10 | 1.1592774E-10 | 1.2365670E-10 | -4.7910343E-10 | 5.6547859E-11 |
| A11 | -4.4038882E-11 | -3.1936913E-12 | 1.6764681E-11 | -2.8026592E-11 |
| A12 | 1.0301957E-13 | 1.6679123E-13 | -8.6962200E-13 | 1.9099758E-12 |
| A13 | 5.2151145E-13 | -5.1896762E-14 | 1.6556170E-13 | 5.2209091E-14 |
| A14 | -4.8841366E-14 | 3.6657717E-15 | -1.3375551E-14 | -1.1390327E-14 |
| A15 | 1.9243451E-15 | -9.8955122E-17 | 4.9426908E-16 | 5.1951185E-16 |
| A16 | -2.9617320E-17 | 9.3679787E-19 | -7.3757413E-18 | -8.5032324E-18 |

| Sn | 13 | 14 |
| --- | --- | --- |
| KA | 5.0000000E+00 | -1.0094773E+00 |
| A3 | 0.0000000E+00 | 0.0000000E+00 |
| A4 | -1.7593414E-04 | -2.7186497E-04 |
| A5 | -1.0652608E-05 | 5.2021161E-06 |
| A6 | 1.1361334E-06 | 1.6354320E-07 |
| A7 | 1.9095158E-07 | 4.4727793E-07 |
| A8 | 4.9435699E-10 | -6.8400887E-08 |
| A9 | -5.9457742E-10 | 3.7020845E-09 |
| A10 | -8.1003012E-11 | 8.4240311E-10 |
| A11 | 2.4888762E-12 | -1.9443825E-10 |
| A12 | -2.0648580E-13 | 1.4100283E-11 |
| A13 | 1.0451133E-13 | -8.9010631E-15 |
| A14 | -9.4937544E-15 | -5.9032073E-14 |
| A15 | 3.4953329E-16 | 3.4277990E-15 |
| A16 | -5.0126643E-18 | -6.5387054E-17 |

Example 6

Figure 17:
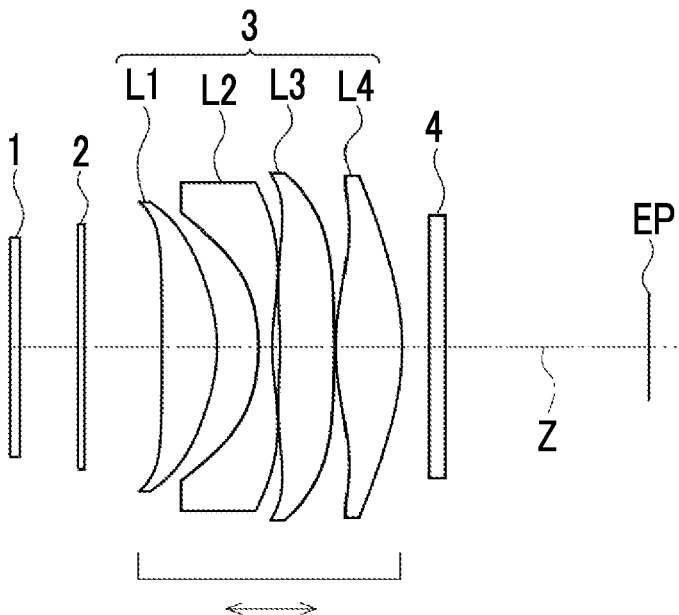
FIG. 17 is a cross-sectional view illustrating a configuration of an observation optical system of Example 6.

FIG. 17 illustrates a configuration of an observation optical system of Example 6. The observation optical system of Example 6 comprises the display element 1, the optical member 2, the eyepiece lens 3, and the optical member 4 in order from the display element side to the eyepoint side.

The eyepiece lens 3 consists of four lenses of the first lens L1 to the fourth lens L4 in order from the display element side to the eyepoint side. The first lens L1 is a positive lens having a biconvex shape in a paraxial region. The second lens L2 is a negative lens having a biconcave shape in a paraxial region. The third lens L3 is a negative lens having a meniscus shape of which a concave surface faces toward the display element side in a paraxial region. The fourth lens L4 is a positive lens having a biconvex shape in a paraxial region. All of the first lens L1 to the fourth lens L4 are single lenses. Both surfaces of all of the first lens L1 to the fourth lens L4 are aspherical surfaces. In the diopter adjustment, the four lenses of the first lens L1 to the fourth lens L4 move as a single body.

Figure 18:
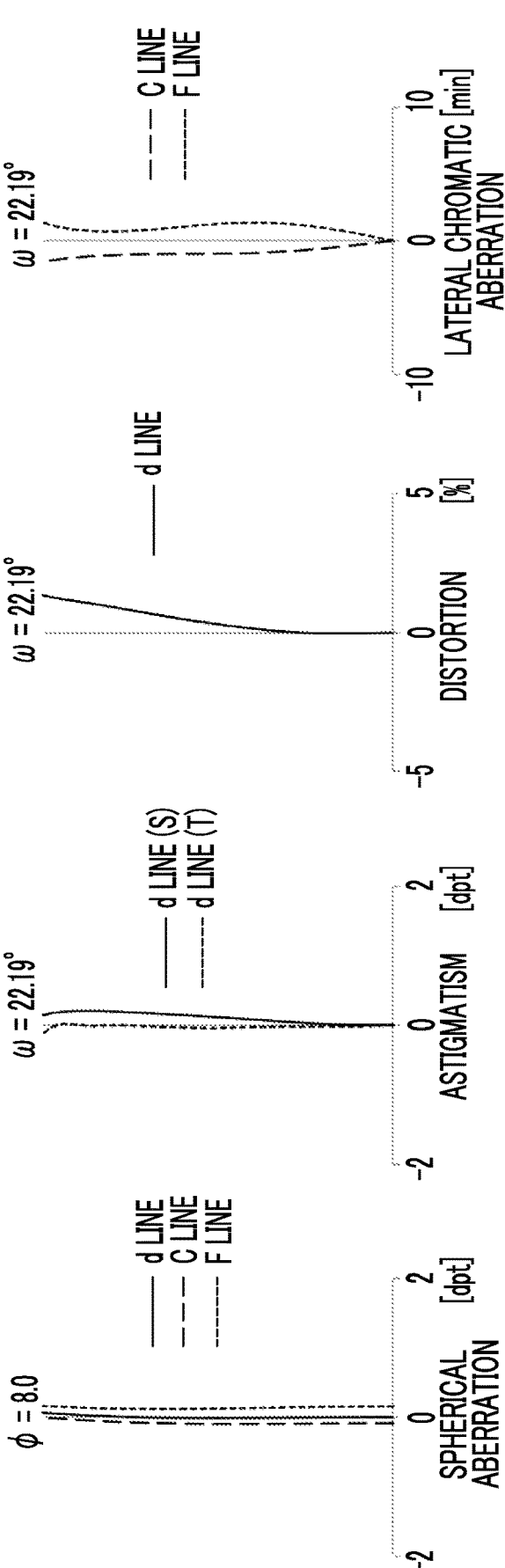
FIG. 18 is a spherical aberration diagram, an astigmatism diagram, a distortion diagram, and a lateral chromatic aberration diagram of the observation optical system of Example 6.
Figure 19:
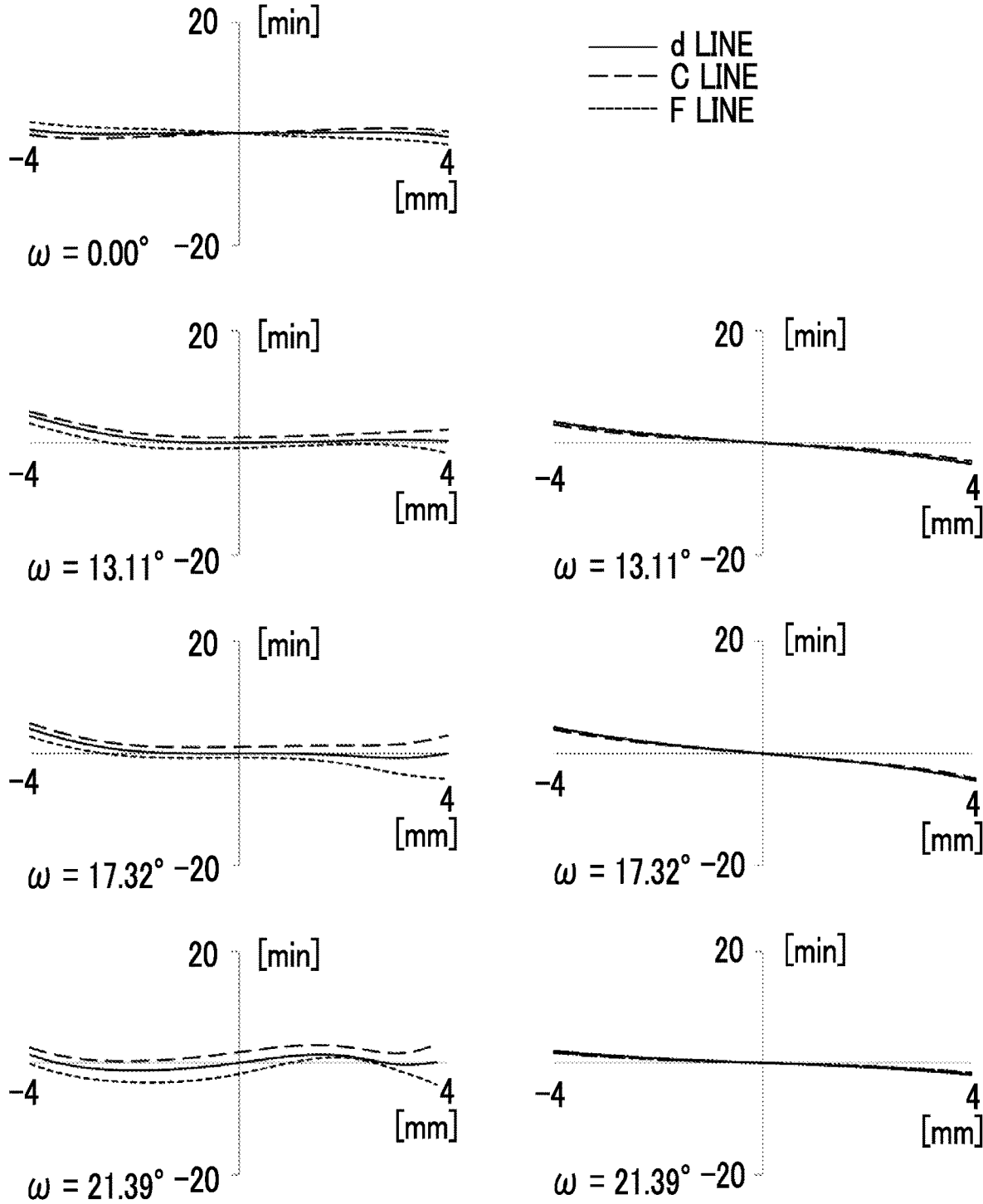
FIG. 19 is a lateral aberration diagram of the observation optical system of Example 6.

For the observation optical system of Example 6, basic lens data is shown in Table 21, specifications are shown in Table 22, variable surface spacing is shown in Table 23, aspherical coefficients are shown in Table 24, and various aberration diagrams are illustrated in FIG. 18 and FIG. 19.

TABLE 21

| Example 6 | | | | |
| --- | --- | --- | --- | --- |
| Sn | R | D | Nd | vd |
| --- | --- | --- | --- | --- |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | DD[4] | | |
| *5 | 616.5674 | 4.0711 | 1.88202 | 37.22 |

TABLE 21-continued

| Example 6 | | | | |
|---|---|---|---|---|
| Sn | R | D | Nd | vd |
| *6 | −12.2622 | 3.0354 | | |
| *7 | −14.4566 | 1.0099 | 1.82115 | 24.06 |
| *8 | 17.5015 | 0.5785 | | |
| *9 | −30.9768 | 4.0166 | 1.72903 | 54.04 |
| *10 | −78.6854 | 0.1000 | | |
| *11 | 19.6667 | 4.8110 | 1.80139 | 45.45 |
| *12 | −20.4101 | DD[12] | | |
| 13 | ∞ | 1.2000 | 1.49023 | 57.50 |
| 14 | ∞ | 15.0000 | | |
| 15 (EP) | ∞ | | | |

TABLE 22

| Example 6 | | | | |
|---|---|---|---|---|
| Diopter | −1 dpt | −4 dpt | +2 dpt | 0 dpt |
| f | 21.227 | 21.227 | 21.227 | 21.227 |
| Visual Angle [°] | 42.780 | 42.390 | 42.890 | 42.850 |
| H | 8.198 | | | |

TABLE 23

| Example 6 | | | | |
|---|---|---|---|---|
| Diopter | −1 dpt | −4 dpt | +2 dpt | 0 dpt |
| DD[4] | 5.6885 | 4.3177 | 7.0409 | 6.1396 |
| DD[12] | 1.9925 | 3.3632 | 0.6400 | 1.5413 |

TABLE 24

| Example 6 | | | | |
|---|---|---|---|---|
| Sn | 5 | 6 | 7 | 8 |
| KA | −5.0000000E+00 | 9.5244338E−01 | 9.0466668E−01 | −3.6117870E+00 |
| A3 | 0.0000000E+00 | 0.0000000E+00 | 0.0000000E+00 | 0.0000000E+00 |
| A4 | −1.8583078E−04 | 2.5907973E−04 | −8.9844051E−05 | −5.7075019E−04 |
| A5 | 1.7235670E−05 | 3.9408693E−06 | −2.7570891E−06 | −9.6977805E−06 |
| A6 | 3.5996922E−06 | −1.4272011E−06 | −7.4325404E−06 | 7.7360444E−06 |
| A7 | −8.2262040E−07 | −3.9785570E−08 | 8.4548039E−07 | 1.7231654E−07 |
| A8 | 7.4528851E−08 | −2.7139171E−09 | −9.4832166E−08 | −9.4410822E−08 |
| A9 | −1.7852742E−09 | −3.2797270E−10 | 2.6031376E−08 | 1.5623657E−09 |
| A10 | −1.2059983E−09 | 1.3207774E−10 | −2.7829757E−09 | 5.2034226E−10 |
| A11 | 2.0618998E−10 | 8.9014471E−13 | 9.6750796E−11 | −4.1234137E−11 |
| A12 | −9.7378242E−12 | −2.4180567E−12 | −3.1062068E−12 | 2.8968286E−12 |
| A13 | −1.1532477E−12 | 3.6096455E−13 | 1.2818452E−12 | −1.9460797E−13 |
| A14 | 1.9521773E−13 | −2.8299602E−14 | −1.7030424E−13 | 4.2035852E−15 |
| A15 | −1.0926395E−14 | 1.1739077E−15 | 9.4648809E−15 | 1.6459083E−16 |
| A16 | 2.2400068E−16 | −2.0194223E−17 | −1.9994649E−16 | −6.3244469E−18 |

| Sn | 9 | 10 | 11 | 12 |
|---|---|---|---|---|
| KA | 1.8471500E+00 | 5.0000090E+00 | 9.3936187E−01 | 9.7456381E−01 |
| A3 | 0.0000000E+00 | 0.0000000E+00 | 0.0000000E+00 | 0.0000000E+00 |
| A4 | 7.0256650E−04 | 7.2219286E−05 | −2.5482659E−04 | 5.5919501E−05 |
| A5 | −2.1578964E−05 | 4.1665359E−06 | 7.8881733E−06 | −6.5105152E−07 |
| A6 | −1.1123071E−05 | −3.0975649E−06 | 1.4282095E−06 | 5.5582152E−07 |
| A7 | 1.7427376E−06 | −1.5852583E−07 | −1.9317903E−07 | −1.0937475E−07 |
| A8 | −2.5821195E−07 | 3.2618176E−08 | −1.1901607E−08 | 2.1551701E−08 |
| A9 | 3.7298492E−08 | 2.5189884E−09 | 7.8036895E−10 | −3.9451557E−09 |
| A10 | −3.2763632E−09 | −4.1002080E−10 | 1.9803765E−10 | 3.2766165E−10 |
| A11 | 1.6350927E−10 | 8.2967832E−12 | −6.5876792E−12 | −1.9509912E−12 |
| A12 | −1.0664600E−11 | 9.4895211E−13 | −8.3772132E−13 | −1.3769207E−12 |
| A13 | 1.3939927E−12 | −1.1163914E−13 | 3.4303372E−14 | 8.5173750E−14 |
| A14 | −1.1645681E−13 | 8.2948958E−15 | −8.6474479E−17 | −1.6925802E−15 |
| A15 | 4.7867494E−15 | −3.4093465E−16 | 3.5805856E−17 | −1.4119479E−17 |
| A16 | −7.7927698E−17 | 5.4727432E−18 | −1.5676519E−18 | 8.1204999E−19 |

Example 7

Figure 20:
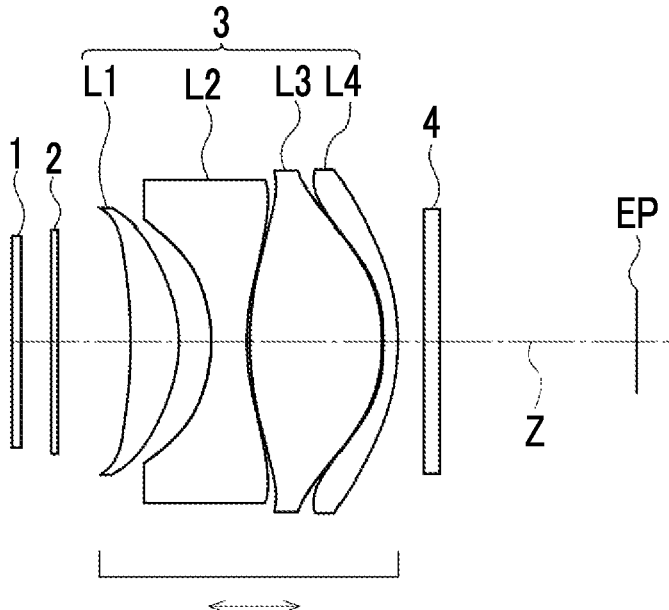
FIG. 20 is a cross-sectional view illustrating a configuration of an observation optical system of Example 7.

FIG. 20 illustrates a configuration of an observation optical system of Example 7. The observation optical system of Example 7 comprises the display element 1, the optical member 2, the eyepiece lens 3, and the optical member 4 in order from the display element side to the eyepoint side.

The eyepiece lens 3 consists of four lenses of the first lens L1 to the fourth lens L4 in order from the display element side to the eyepoint side. The first lens L1 is a positive lens having a meniscus shape of which a concave surface faces toward the display element side in a paraxial region. The second lens L2 is a negative lens having a biconcave shape in a paraxial region. The third lens L3 is a positive lens having a biconvex shape in a paraxial region. The fourth lens L4 is a positive lens having a meniscus shape of which a concave surface faces toward the display element side in a paraxial region. All of the first lens L1 to the fourth lens L4 are single lenses. Both surfaces of all of the first lens L1 to the fourth lens L4 are aspherical surfaces. In the diopter adjustment, the four lenses of the first lens L1 to the fourth lens L4 move as a single body.

Figure 21:
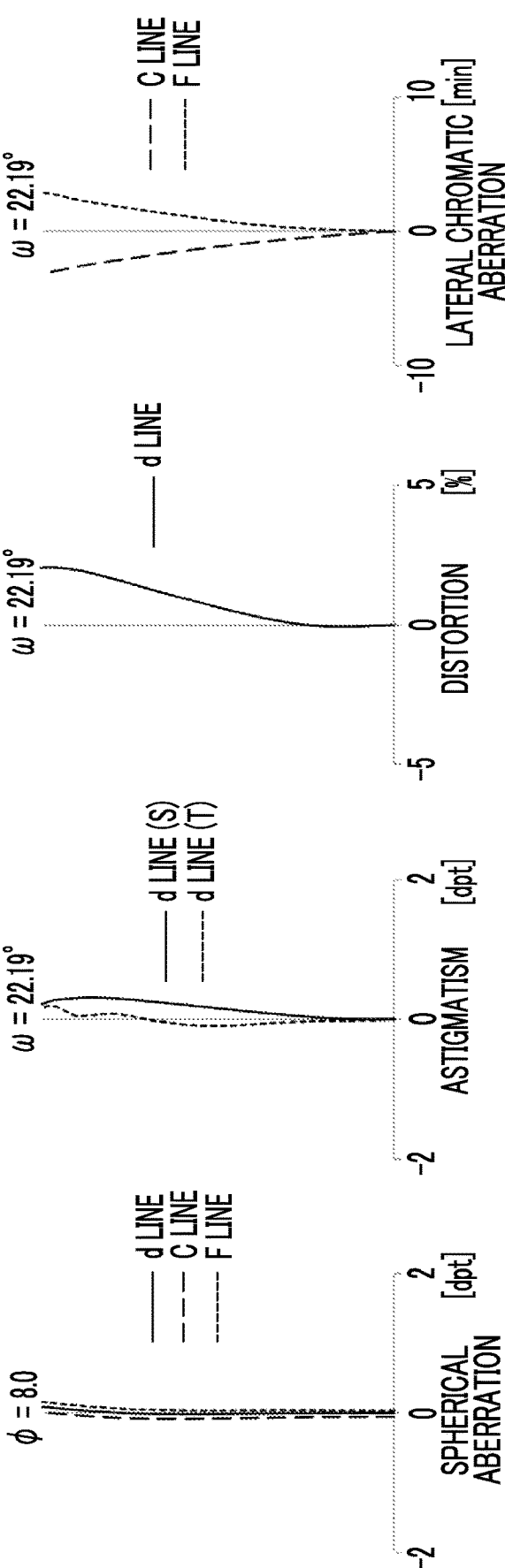
FIG. 21 is a spherical aberration diagram, an astigmatism diagram, a distortion diagram, and a lateral chromatic aberration diagram of the observation optical system of Example 7.
Figure 22:
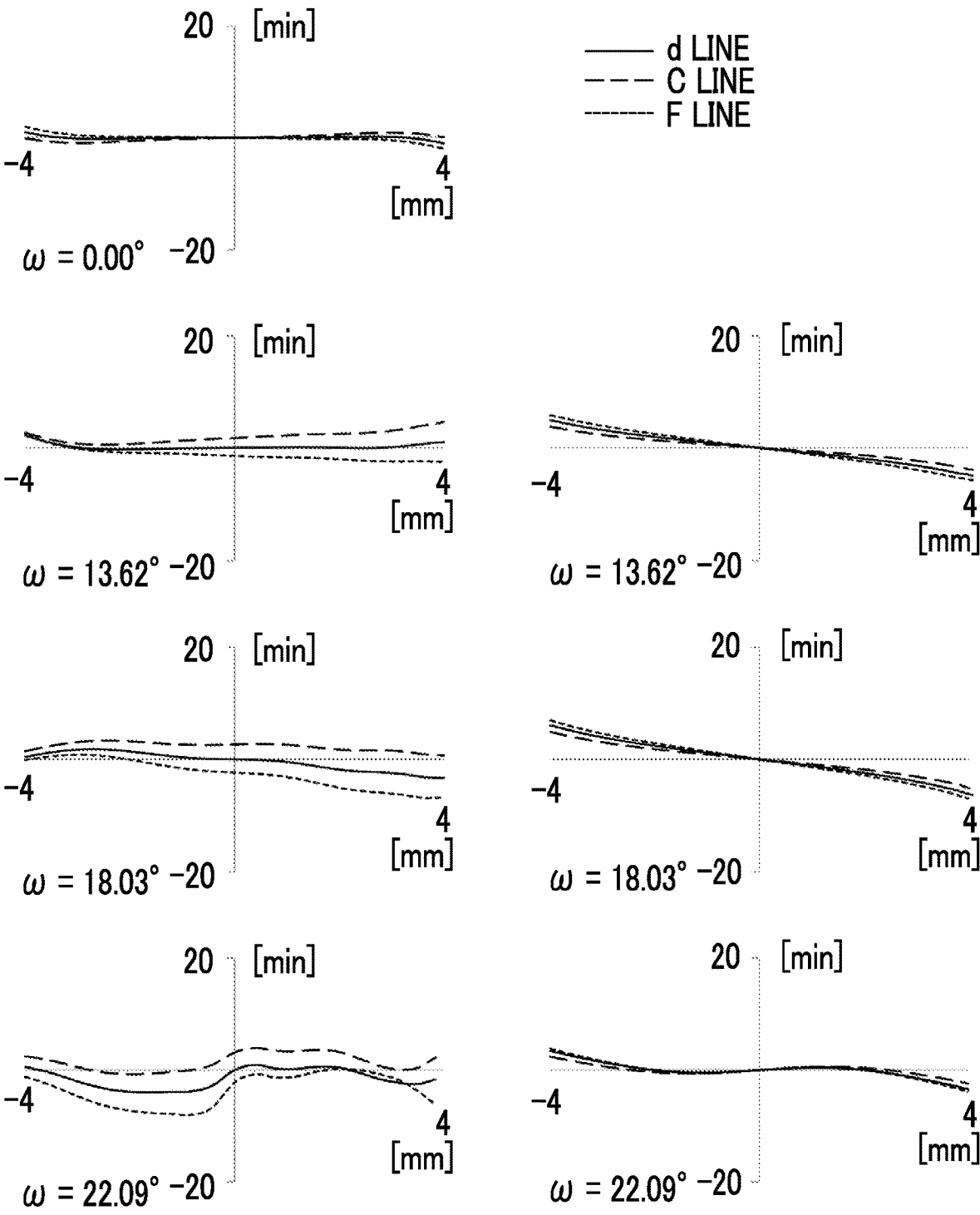
FIG. 22 is a lateral aberration diagram of the observation optical system of Example 7.

For the observation optical system of Example 7, basic lens data is shown in Table 25, specifications are shown in Table 26, variable surface spacing is shown in Table 27, aspherical coefficients are shown in Table 28, and various aberration diagrams are illustrated in FIG. 21 and FIG. 22.

TABLE 25

| | | Example 7 | | |
|---|---|---|---|---|
| Sn | R | D | Nd | vd |
| 1 | ∞ | 0.7000 | 1.51680 | 64.20 |
| 2 | ∞ | 2.3000 | | |
| 3 | ∞ | 0.5000 | 1.49023 | 57.49 |

TABLE 25-continued

| | | Example 7 | | |
|---|---|---|---|---|
| Sn | R | D | Nd | vd |
| 4 | ∞ | DD[4] | | |
| *5 | −46.4765 | 3.6763 | 1.80610 | 40.73 |
| *6 | −11.4945 | 2.4522 | | |
| *7 | −11.7625 | 2.6928 | 1.63351 | 23.63 |
| *8 | 19.4300 | 0.2536 | | |
| *9 | 26.3867 | 10.0000 | 1.80139 | 45.45 |
| *10 | −18.5475 | 0.1000 | | |
| *11 | −27.3292 | 1.1018 | 1.53389 | 55.98 |
| *12 | −19.4953 | DD[12] | | |
| 13 | ∞ | 1.2000 | 1.49023 | 57.50 |
| 14 | ∞ | 15.0000 | | |
| 15 (EP) | ∞ | | | |

TABLE 26

| | | Example 7 | | |
|---|---|---|---|---|
| Diopter | −1 dpt | −4 dpt | +2 dpt | 0 dpt |
| f | 20.537 | 20.537 | 20.537 | 20.537 |
| Visual Angle [°] | 44.180 | 43.830 | 44.420 | 44.280 |
| H | | | 8.198 | |

TABLE 27

| | | Example 7 | | |
|---|---|---|---|---|
| Diopter | −1 dpt | −4 dpt | +2 dpt | 0 dpt |
| DD[4] | 5.5523 | 4.2754 | 6.8192 | 5.9742 |
| DD[12] | 1.9754 | 3.2523 | 0.7085 | 1.5535 |

TABLE 28

| | | | Example 7 | | |
|---|---|---|---|---|
| Sn | 5 | 6 | 7 | 8 |
| KA | −4.2839204E+00 | 9.7754541E−01 | 9.8635196E−01 | −7.4722749E−01 |
| A3 | 0.0000000E+00 | 0.0000000E+00 | 0.0000000E+00 | 0.0000000E+00 |
| A4 | −3.5271235E−04 | 1.3412592E−04 | 6.9123991E−04 | 3.3222255E−04 |
| A5 | 8.2709224E−05 | 1.3906928E−06 | −1.3798587E−04 | −7.8241583E−05 |
| A6 | −3.1458771E−06 | 9.8450356E−07 | −2.1650367E−06 | −2.2365257E−06 |
| A7 | −6.3082482E−07 | 1.2207959E−08 | 1.0196909E−06 | 7.8387571E−07 |
| A8 | 1.1342583E−08 | 1.5345962E−09 | 3.6938381E−07 | 4.5607225E−08 |
| A9 | 1.8276300E−08 | −2.6517252E−09 | −9.7272195E−08 | −8.5060861E−09 |
| A10 | −2.0439283E−09 | 1.1662495E−11 | 6.8854482E−09 | 6.4674178E−11 |
| A11 | −4.9811964E−12 | 1.4256969E−11 | 2.3643212E−10 | 3.3572419E−12 |
| A12 | 1.5057226E−12 | 8.0491217E−13 | −4.2970419E−11 | 2.7734629E−12 |
| A13 | 1.7179214E−12 | −3.0132681E−13 | −2.8579815E−12 | −3.0968379E−13 |
| A14 | −2.2962728E−13 | 3.1823702E−14 | 7.8112077E−13 | 1.9307041E−14 |
| A15 | 1.2308459E−14 | −1.6509671E−15 | −5.2541659E−14 | −7.6621094E−16 |
| A16 | −2.5633226E−16 | 3.3870113E−17 | 1.2436216E−15 | 1.3310269E−17 |

| | | | | |
|---|---|---|---|---|
| Sn | 9 | 10 | 11 | 12 |
| KA | −4.7204541E+00 | 8.9908503E−01 | 2.2698553E+00 | 8.8284649E−01 |
| A3 | 0.0000000E+00 | 0.0000000E+00 | 0.0000000E+00 | 0.0000000E+00 |
| A4 | 9.2098976E−05 | −8.0145006E−04 | −1.2982584E−03 | −8.1925120E−05 |
| A5 | −1.1531736E−06 | 3.5470579E−05 | 5.5237999E−05 | −8.1307342E−06 |
| A6 | −1.8832531E−06 | 1.0140112E−05 | 7.3530837E−06 | 2.3587339E−06 |
| A7 | 5.1828945E−08 | −2.9928719E−07 | 3.6170127E−06 | 4.6397351E−08 |
| A8 | 6.9041284E−09 | −1.0599093E−07 | −8.3795360E−07 | −1.3729547E−08 |
| A9 | 8.0972688E−10 | 7.0029862E−09 | 4.6623142E−08 | 1.3328415E−10 |
| A10 | −8.6866571E−12 | −2.3090192E−10 | 2.9845118E−09 | −2.6722578E−11 |
| A11 | −2.0798835E−11 | 5.0617136E−11 | −5.4014190E−10 | 9.4604150E−14 |
| A12 | 1.0775423E−12 | −3.9084402E−12 | 1.9168007E−11 | 4.3739472E−13 |
| A13 | 9.9530704E−14 | 3.7767872E−15 | 2.0726637E−12 | −2.0195755E−14 |

TABLE 28-continued

| | | Example 7 | | |
|---|---|---|---|---|
| A14 | −1.2425657E−14 | 9.2845653E−15 | −2.6953120E−13 | 5.8150607E−16 |
| A15 | 5.1220821E−16 | −3.3902698E−16 | 1.2055360E−14 | −5.4335413E−17 |
| A16 | −8.0159582E−18 | 3.8235026E−18 | −1.9824961E−16 | 1.6367956E−18 |

Table 29 and Table 30 show corresponding values of Conditional Expressions (1) to (25) of the observation optical systems of Examples 1 to 7. Table 31 shows a focal length of each lens of Examples 1 to 7. In Table 31, f3, f4, and f5 denote a focal length of the third lens L3, a focal length of the fourth lens L4, and a focal length of the fifth lens L5, respectively. Values shown in Table 29 to Table 31 are values based on the d line.

TABLE 29

| Expression Number | Conditional Expression | Example 1 | Example 2 | Example 3 | Example 4 |
|---|---|---|---|---|---|
| (1) | H/f | 0.390 | 0.388 | 0.402 | 0.389 |
| (2) | (R2r + R2f)/(R2r − R2f) | 0.184 | 0.301 | 0.306 | 0.097 |
| (3) | (R2f − R1r)/(R2f + R1r) | 0.014 | −0.023 | 0.022 | −0.053 |
| (4) | (R1r + R1f)/(R1r − R1f) | −0.957 | −1.349 | −1.430 | −0.627 |
| (5) | (R3r + R3f)/(R3r − R3f) | 1.952 | −0.782 | −0.394 | −0.221 |
| (6) | Nmax | 1.774 | 1.806 | 1.806 | 1.806 |
| (7) | f/f2 | −1.877 | −1.802 | −1.792 | −2.000 |
| (8) | f/f12 | −0.093 | −0.257 | −0.275 | −0.199 |
| (9) | f/fr | 1.348 | 1.427 | 1.330 | 1.394 |
| (10) | f1/f2 | −1.360 | −1.487 | −1.391 | −1.408 |
| (11) | f1/fr | 0.977 | 1.177 | 1.032 | 0.981 |
| (12) | f2/fr | −0.718 | −0.792 | −0.742 | −0.697 |
| (13) | (R3f − R2r)/(R3f1 + R2r) | 4.558 | 0.757 | 0.329 | 0.322 |
| (14) | dL/f | 1.392 | 1.432 | 1.575 | 1.484 |
| (15) | dL12/T2 | 0.509 | 0.516 | 0.563 | 0.503 |
| (16) | H/TL | 0.284 | 0.275 | 0.259 | 0.265 |
| (17) | d01/f | 0.445 | 0.440 | 0.378 | 0.491 |
| (18) | H/f2 | −0.733 | −0.700 | −0.721 | −0.777 |
| (19) | H/fr | 0.526 | 0.554 | 0.535 | 0.542 |
| (20) | f/f1 | 1.380 | 1.212 | 1.288 | 1.421 |
| (21) | (R4f − R3r)/(R4f + R3r) | −1.531 | 1.863 | 0.575 | |
| (22) | (R4r + R4f)/(R4r − R4f) | 0.102 | −0.284 | −2.619 | |
| (23) | d12/d2 | 1.106 | 1.308 | 0.610 | 0.355 |
| (24) | d12/TL | 0.092 | 0.105 | 0.061 | 0.041 |
| (25) | H/f1 | 0.539 | 0.471 | 0.518 | 0.552 |

TABLE 30

| Expression Number | Conditional Expression | Example 5 | Example 6 | Example 7 |
|---|---|---|---|---|
| (1) | H/f | 0.421 | 0.386 | 0.399 |
| (2) | (R2r + R2f)/(R2r − R2f) | 0.413 | 0.095 | 0.246 |
| (3) | (R2f − R1r)/(R2f + R1r) | −0.023 | 0.082 | 0.012 |
| (4) | (R1r + R1f)/(R1r − R1f) | −1.072 | −0.961 | −1.657 |
| (5) | (R3r + R3f)/(R3r − R3f) | −0.789 | 2.299 | −0.174 |
| (6) | Nmax | 1.806 | 1.882 | 1.806 |
| (7) | f/f2 | −1.568 | −2.233 | −1.835 |
| (8) | f/f12 | −0.037 | −0.137 | −0.455 |
| (9) | f/fr | 1.222 | 1.436 | 1.474 |
| (10) | f1/f2 | −1.231 | −1.438 | −1.617 |
| (11) | f1/fr | 0.959 | 0.925 | 1.299 |
| (12) | f2/fr | −0.779 | −0.643 | −0.803 |
| (13) | (R3f − R2r)/(R3f1 + R2r) | 0.716 | 3.598 | 0.152 |
| (14) | dL/f | 1.647 | 1.357 | 1.428 |
| (15) | dL12/T2 | 0.575 | 0.429 | 0.505 |
| (16) | H/TL | 0.259 | 0.289 | 0.283 |
| (17) | d01/f | 0.369 | 0.508 | 0.421 |
| (18) | H/f2 | −0.660 | −0.862 | −0.733 |
| (19) | H/fr | 0.514 | 0.555 | 0.588 |
| (20) | f/f1 | 1.274 | 1.553 | 1.135 |
| (21) | (R4f − R3r)/(R4f + R3r) | 0.978 | −1.666 | 0.191 |
| (22) | (R4r + R4f)/(R4r − R4f) | −1.030 | 0.019 | −5.977 |
| (23) | d12/d2 | 0.796 | 3.006 | 0.911 |
| (24) | d12/TL | 0.067 | 0.107 | 0.085 |
| (25) | H/f1 | 0.536 | 0.600 | 0.453 |

TABLE 31

| | Example 1 | Example 2 | Example 3 | Example 4 | Example 5 | Example 6 | Example 7 |
|---|---|---|---|---|---|---|---|
| f1 | 15.216 | 17.409 | 15.823 | 14.849 | 15.300 | 13.673 | 18.096 |
| f2 | −11.186 | −11.711 | −11.373 | −10.549 | −12.431 | −9.506 | −11.191 |
| f3 | −78.864 | 21.461 | 16.936 | 15.132 | 23.189 | −72.658 | 15.084 |
| f4 | 13.814 | 43.426 | 102.068 | | 48.176 | 13.203 | 121.443 |
| f5 | | | | | 642.229 | | |

As is perceived from the data described above, in the observation optical systems of Examples 1 to 7, the visual angle at the half angle of view is greater than or equal to 20 degrees, more specifically, greater than or equal to 21 degrees, and is a wide visual angle. In addition, the observation optical systems of Examples 1 to 7 implement high optical performance by favorably correcting various aberrations.

Figure 23:
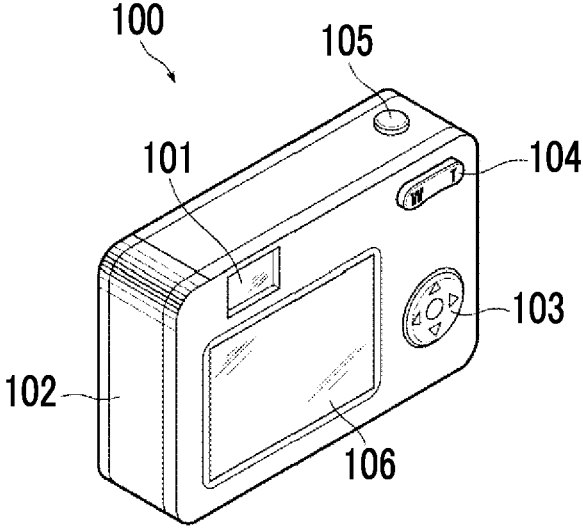
FIG. 23 is a perspective view of a rear surface side of an optical apparatus according to one embodiment.

Next, an optical apparatus comprising the observation optical system according to the embodiment of the present disclosure will be described. FIG. 23 is a perspective view illustrating a schematic configuration of a rear surface side of a camera 100 that is an optical apparatus according to one embodiment of the present disclosure. As an example, the camera 100 is a digital camera. The camera 100 comprises a finder 101 according to one embodiment of the present disclosure in an upper portion of a camera body 102. The finder 101 is an example of an observation optical apparatus and comprises the observation optical system according to one embodiment of the present disclosure.

The camera 100 comprises an operation button 103 for performing various settings, a zoom lever 104 for changing magnification, and a monitor 106 displaying images and various setting screens on a rear surface of the camera body 102 and comprises a shutter button 105 on an upper surface of the camera body 102. In addition, the camera 100 comprises an imaging lens (not illustrated) on a front surface of the camera body 102 and comprises an imaging element (not illustrated) capturing a subject image formed by the imaging lens inside the camera body 102. A user observes the subject image through the finder 101 from the rear surface side.

While the disclosed technology is illustratively described above using the embodiment and the examples, the disclosed technology is not limited to the embodiment and the examples and can be subjected to various modifications. For example, the curvature radius, the surface spacing, the refractive index, the Abbe number, and the aspherical coefficient of each lens are not limited to the values illustrated in each of the above numerical value examples and may have other values. In addition, the optical apparatus according to the embodiment of the present disclosure is not limited to the above example. The present disclosure can also be applied to a film camera, a video camera, a head-mounted display, and the like.

All documents, patent applications, and technical standards disclosed in the present specification are incorporated in the present specification by reference to the same extent as in a case where each of the documents, patent applications, and technical standards are specifically and individually indicated to be incorporated by reference.

What is claimed is:

1. An observation optical system comprising:
a display element; and
an eyepiece lens disposed on an eyepoint side of the display element,
wherein the eyepiece lens consists of four or more lenses, and the eyepiece lens includes a first lens having positive optical power, a second lens having negative optical power, and a third lens consecutively in order from closest to a display element side to the eyepoint side,
in a case where a half value of a longest diameter of a display region in the display element is denoted by H, and a focal length of the eyepiece lens in a state where diopter is −1 diopter is denoted by f, Conditional Expression (1) is satisfied, which is represented by $$0.35 < H/f < 0.6 \qquad (1), \text{ and}$$

in a case where a paraxial curvature radius of a surface of the second lens on the display element side is denoted by R2f, and a paraxial curvature radius of a surface of the second lens on the eyepoint side is denoted by R2r, Conditional Expression (2-1) is satisfied, which is represented by $$0.06 < (R2r + R2f)/(R2r - R2f) < 0.65 \qquad (2).$$

2. The observation optical system according to claim 1, wherein in diopter adjustment, at least three lenses in the eyepiece lens move along an optical axis.

3. The observation optical system according to claim 1, wherein a lens surface of the first lens on the display element side has a shape in which negative optical power is increased in a direction of separation from an optical axis, or a shape in which positive optical power is decreased in the direction of separation from the optical axis.

4. The observation optical system according to claim 1, wherein a lens surface of the second lens on the eyepoint side has a shape in which positive optical power is increased in a direction of separation from an optical axis, or a shape in which negative optical power is decreased in the direction of separation from the optical axis.

5. The observation optical system according to claim 1, wherein the eyepiece lens consists of four lenses.

6. The observation optical system according to claim 1, wherein in a case where a paraxial curvature radius of a surface of the first lens on the eyepoint side is denoted by R1r, Conditional Expression (3) is satisfied, which is represented by $$-0.13 < (R2f - R1r)/(R2f + R1r) < 0.2 \qquad (3).$$

7. The observation optical system according to claim 1, wherein in a case where a paraxial curvature radius of a surface of the first lens on the display element side is denoted by R1f, and a paraxial curvature radius of a surface of the first lens on the eyepoint side is denoted by R1r, Conditional Expression (4) is satisfied, which is represented by $$-5 < (R1r + R1f)/(R1r - R1f) < -0.2 \qquad (4).$$

8. The observation optical system according to claim 1, wherein in a case where a paraxial curvature radius of a surface of the third lens on the display element side is denoted by R3f, and a paraxial curvature radius of a surface of the third lens on the eyepoint side is denoted by R3r, Conditional Expression (5) is satisfied, which is represented by $$-2.5 < (R3r + R3f)/(R3r - R3f) < 8 \tag{5}$$

9. The observation optical system according to claim 1, wherein in a case where a maximum value of refractive indexes of all lenses provided in the eyepiece lens with respect to a d line is denoted by Nmax, Conditional Expression (6) is satisfied, which is represented by $$1.61 < Nmax < 2.2 \tag{6}$$

10. The observation optical system according to claim 1, wherein in a case where a focal length of the second lens is denoted by f2, Conditional Expression (7) is satisfied, which is represented by $$-4 < f/f2 < -0.9 \tag{7}$$

11. The observation optical system according to claim 1, wherein in a case where a combined focal length of the first lens and the second lens in a state where the diopter is −1 diopter is denoted by f12, Conditional Expression (8) is satisfied, which is represented by $$-1 < f/f12 < 0.12 \tag{8}$$

12. The observation optical system according to claim 1, wherein in a case where a combined focal length of all lenses on the eyepoint side with respect to the second lens in a state where the diopter is −1 diopter is denoted by fr, Conditional Expression (9) is satisfied, which is represented by $$0.83 < f/fr < 2 \tag{9}$$

13. The observation optical system according to claim 1, wherein in a case where a focal length of the first lens is denoted by f1, and a focal length of the second lens is denoted by f2, Conditional Expression (10) is satisfied, which is represented by $$-2.2 < f1/f2 < -0.73 \tag{10}$$

14. The observation optical system according to claim 1, wherein in a case where a focal length of the first lens is denoted by f1, and a combined focal length of all lenses on the eyepoint side with respect to the second lens in a state where the diopter is −1 diopter is denoted by fr, Conditional Expression (11) is satisfied, which is represented by $$0.66 < f1/fr < 1.6 \tag{11}$$

15. The observation optical system according to claim 1, wherein in a case where a focal length of the second lens is denoted by f2, and a combined focal length of all lenses on the eyepoint side with respect to the second lens in a state where the diopter is −1 diopter is denoted by fr, Conditional Expression (12) is satisfied, which is represented by $$-0.98 < f2/fr < -0.4 \tag{12}$$

16. The observation optical system according to claim 1, wherein in a case where a paraxial curvature radius of a surface of the third lens on the display element side is denoted by R3f, Conditional Expression (13) is satisfied, which is represented by $$-0.6 < (R3f - R2r)/(R3f + R2r) < 9 \tag{13}$$

17. The observation optical system according to claim 1, wherein in a case where a distance on an optical axis from a surface of the first lens on the display element side to a lens surface of the eyepiece lens closest to the eyepoint side in a state where the diopter is −1 diopter is denoted by dL, Conditional Expression (14) is satisfied, which is represented by $$1.6 < dL/f < 2.25 \tag{14}$$

18. The observation optical system according to claim 1, wherein in a case where a distance on an optical axis from a surface of the first lens on the display element side to a surface of the second lens on the eyepoint side in a state where the diopter is −1 diopter is denoted by dL12, and a sum of an air conversion distance on the optical axis from a display surface of the display element to the surface of the first lens on the display element side and a distance on the optical axis from the surface of the first lens on the display element side to the surface of the second lens on the eyepoint side in a state where the diopter is −1 diopter is denoted by T2, Conditional Expression (15) is satisfied, which is represented by $$0.25 < dL12/T2 < 0.81 \tag{15}$$

19. The observation optical system according to claim 1, wherein in a case where a sum of an air conversion distance on an optical axis from a display surface of the display element to a surface of the first lens on the display element side and a distance on the optical axis from the surface of the first lens on the display element side to a lens surface of the eyepiece lens closest to the eyepoint side in a state where the diopter is −1 diopter is denoted by TL, Conditional Expression (16) is satisfied, which is represented by $$0.18 < H/TL < 0.65 \tag{16}$$

20. The observation optical system according to claim 1, wherein in a case where an air conversion distance on an optical axis from a display surface of the display element to a surface of the first lens on the display element side in a state where the diopter is −1 diopter is denoted by d01, Conditional Expression (17) is satisfied, which is represented by $$0.24 < d01/f < 0.8 \tag{17}$$

21. The observation optical system according to claim 1, wherein in a case where a focal length of the second lens is denoted by f2, Conditional Expression (18) is satisfied, which is represented by $$-1.15 < H/f2 < -0.35 \tag{18}$$

22. The observation optical system according to claim 1, wherein in a case where a combined focal length of all lenses on the eyepoint side with respect to the second lens in a state where the diopter is −1 diopter is denoted by fr, Conditional Expression (19) is satisfied, which is represented by $$0.32 < H/fr < 0.78 \tag{19}$$

23. The observation optical system according to claim 1, wherein in a case where a focal length of the first lens is denoted by f1, Conditional Expression (20) is satisfied, which is represented by $$0.7 < f/f1 < 2.2 \tag{20}$$

24. The observation optical system according to claim 1, wherein the eyepiece lens includes the first lens, the second lens, the third lens, and a fourth lens consecutively in order from closest to the display element side to the eyepoint side, and in a case where a paraxial curvature radius of a surface of the fourth lens on the display element side is denoted by R4f, and a paraxial curvature radius of a surface of the third lens on the eyepoint side is denoted by R3r, Conditional Expression (21) is satisfied, which is represented by $$-4<(R4f-R3r)/(R4f+R3r)<4.2 \tag{21}.$$

25. The observation optical system according to claim 1, wherein the eyepiece lens includes the first lens, the second lens, the third lens, and a fourth lens consecutively in order from closest to the display element side to the eyepoint side, and in a case where a paraxial curvature radius of a surface of the fourth lens on the display element side is denoted by R4f, and a paraxial curvature radius of a surface of the fourth lens on the eyepoint side is denoted by R4r, Conditional Expression (22) is satisfied, which is represented by $$-15<(R4r+R4f)/(R4r-R4f)<0.5 \tag{22}.$$

26. The observation optical system according to claim 1, wherein in a case where a distance on an optical axis from a surface of the first lens on the eyepoint side to a surface of the second lens on the display element side in a state where the diopter is −1 diopter is denoted by d12, and a thickness of the second lens on the optical axis is denoted by d2, Conditional Expression (23) is satisfied, which is represented by $$0.15<d12/d2<5.8 \tag{23}.$$

27. The observation optical system according to claim 1, wherein in a case where a distance on an optical axis from a surface of the first lens on the eyepoint side to a surface of the second lens on the display element side in a state where the diopter is −1 diopter is denoted by d12, and a sum of an air conversion distance on the optical axis from a display surface of the display element to a surface of the first lens on the display element side and a distance on the optical axis from the surface of the first lens on the display element side to a lens surface of the eyepiece lens closest to the eyepoint side in a state where the diopter is −1 diopter is denoted by TL, Conditional Expression (24) is satisfied, which is represented by $$0.01<d12/TL<0.16 \tag{24}.$$

28. The observation optical system according to claim 1, wherein in a case where a focal length of the first lens is denoted by f1, Conditional Expression (25) is satisfied, which is represented by $$0.25<H/f1<0.9 \tag{25}.$$

29. The observation optical system according to claim 1, wherein Conditional Expression (1-1) is satisfied, which is represented by $$0.37<H/f<0.5 \tag{1-1}.$$

30. The observation optical system according to claim 1, wherein in a case where a paraxial curvature radius of a surface of the first lens on the display element side is denoted by R1f, and a paraxial curvature radius of a surface of the first lens on the eyepoint side is denoted by R1r, Conditional Expression (4-1) is satisfied, which is represented by $$-3<(R1r+R1f)/(R1r-R1f)<-0.4 \tag{4-1}.$$

31. The observation optical system according to claim 1, wherein in a case where a paraxial curvature radius of a surface of the third lens on the display element side is denoted by R3f, and a paraxial curvature radius of a surface of the third lens on the eyepoint side is denoted by R3r, Conditional Expression (5-1) is satisfied, which is represented by $$-1.5<(R3r+R3f)/(R3r-R3f)<5 \tag{5-1}.$$

32. The observation optical system according to claim 1, wherein in a case where a maximum value of refractive indexes of all lenses provided in the eyepiece lens with respect to a d line is denoted by Nmax, Conditional Expression (6-1) is satisfied, which is represented by $$1.66<Nmax<2 \tag{6-1}.$$

33. An optical apparatus comprising the observation optical system according to claim 1.

34. An observation optical system comprising:

a display element; and an eyepiece lens disposed on an eyepoint side of the display element, wherein the eyepiece lens consists of four or more lenses, and the eyepiece lens includes a first lens having positive optical power, a second lens having negative optical power, and a third lens consecutively in order from closest to a display element side to the eyepoint side, in a case where a half value of a longest diameter of a display region in the display element is denoted by H, and a focal length of the eyepiece lens in a state where diopter is −1 diopter is denoted by f, Conditional Expression (1) is satisfied, which is represented by $$0.35<H/f<0.6 \tag{1, and}$$

in a case where a paraxial curvature radius of a surface of the second lens on the display element side is denoted by R2f, and a paraxial curvature radius of a surface of the first lens on the eyepoint side is denoted by R1r, Conditional Expression (3-1) is satisfied, which is represented by $$-0.09<(R2f-R1r)/(R2f+R1r)<0.14 \tag{3-1}.$$

* * * * *